(12) United States Patent
Flynn

(10) Patent No.: US 6,739,212 B2
(45) Date of Patent: May 25, 2004

(54) ADJUSTABLE PEDAL CONTROLLER WITH OBSTRUCTION DETECTION

(75) Inventor: Charles Lee Flynn, Davisburg, MI (US)

(73) Assignee: Dura Global Technologies, Inc., Rochester Hills, NJ (US)

( * ) Notice: Subject to any disclaimer, the term of this patent is extended or adjusted under 35 U.S.C. 154(b) by 0 days.

(21) Appl. No.: 09/748,666

(22) Filed: Dec. 22, 2000

(65) Prior Publication Data

US 2002/0078782 A1 Jun. 27, 2002

(51) Int. Cl.⁷ .................................................. G05G 1/14

(52) U.S. Cl. .......................................... 74/512; 74/560

(58) Field of Search ........................... 79/512, 513, 560

(56) References Cited

U.S. PATENT DOCUMENTS

| | | |
|---|---|---|
| 3,319,487 A | 5/1967 | Lystad |
| 3,511,109 A | 5/1970 | Tanaka |
| 3,643,524 A | 2/1972 | Herring |
| 3,643,525 A | 2/1972 | Gibas |
| 3,975,972 A | 8/1976 | Muhleck |
| 4,470,570 A | 9/1984 | Sakurai |
| 4,497,399 A | 2/1985 | Kopich |
| 4,683,977 A | 8/1987 | Salmon |
| 4,779,481 A | 10/1988 | Natzke |
| 4,870,871 A | 10/1989 | Ivan |
| 4,875,385 A | 10/1989 | Sitrin |
| 4,989,474 A | 2/1991 | Cicotte |
| 5,010,782 A | 4/1991 | Asano |
| 5,056,742 A | 10/1991 | Sakurai |
| 5,078,024 A | 1/1992 | Cicotte |
| 5,086,663 A | 2/1992 | Asano |
| 5,351,573 A | 10/1994 | Cicotte |
| 5,460,061 A | 10/1995 | Redding |
| 5,497,326 A * | 3/1996 | Berland et al. ............. 318/468 |
| 5,632,183 A | 5/1997 | Rixon |
| 5,697,260 A | 12/1997 | Rixon |
| 5,722,302 A | 3/1998 | Rixon |
| 5,771,752 A | 6/1998 | Cicotte |
| 5,819,593 A | 10/1998 | Rixon |
| 5,823,064 A | 10/1998 | Cicotte |
| 5,855,143 A | 1/1999 | Ewing |
| 5,861,745 A * | 1/1999 | Herden ............... 324/207.2 |
| 5,884,532 A | 3/1999 | Rixon |
| 5,890,399 A | 4/1999 | Rixon |
| 5,901,614 A | 5/1999 | Ewing |
| 5,913,946 A | 6/1999 | Ewing |
| 5,927,154 A | 7/1999 | Elton |
| 5,937,707 A | 8/1999 | Rixon |
| 5,952,801 A | 9/1999 | Boisvert |
| 5,964,125 A | 10/1999 | Rixon |
| 5,994,858 A | 11/1999 | Miura |
| 5,996,438 A | 12/1999 | Elton |
| 6,019,015 A | 2/2000 | Elton |
| 6,051,945 A | 4/2000 | Furukawa |

(List continued on next page.)

*Primary Examiner*—David A. Bucci
*Assistant Examiner*—Timothy McAnulty
(74) *Attorney, Agent, or Firm*—Richard M. Mescher; Casimir R. Kiczek

(57) ABSTRACT

An adjustable control pedal for a motor vehicle includes an upper arm, a lower arm supported by the upper arm and operatively connected to the upper arm for selected movement relative to the upper arm, and a drive assembly operatively connected to the lower arm to selectively move the lower arm relative to the upper arm. A hall-effect sensor is located adjacent a drive screw and cooperates with a ring magnet rotatable with the drive screw to detect motion information. A controller receives the motion information and activates an electric motor upon initialization of the controller to move the lower pedal arm in a first direction until a first mechanical stop is engaged and establish a home stop position and to move the lower pedal arm in the other direction until a second mechanical stop is engaged and establish a travel stop position.

12 Claims, 24 Drawing Sheets

U.S. PATENT DOCUMENTS

| | | |
|---|---|---|
| 6,064,165 A | 5/2000 | Boisvert |
| 6,070,489 A | 6/2000 | Ananthasivan |
| 6,109,241 A | 8/2000 | Engelgau |
| 6,114,820 A | 9/2000 | Nishigaya |
| 6,125,583 A | 10/2000 | Murray |
| 6,134,492 A | 10/2000 | Breed |
| 6,151,984 A | 11/2000 | Johannsson |
| 6,151,985 A | 11/2000 | Garber |
| 6,151,986 A | 11/2000 | Willemsen |
| 6,247,381 B1 * | 6/2001 | Toelke et al. .................. 74/512 |
| 6,289,761 B1 * | 9/2001 | Reynolds et al. .............. 74/512 |
| 6,298,745 B1 * | 10/2001 | Rison et al. ................... 74/512 |
| 6,316,897 B1 * | 11/2001 | Ewing ......................... 318/551 |

\* cited by examiner

ADJUSTABLE PEDAL CONTROLLER WITH OBSTRUCTION DETECTION

FIELD OF THE INVENTION

The present invention generally relates to improved adjustable pedal assemblies for motor vehicles and, more particularly, to control systems for adjusting control pedals to desired positions.

BACKGROUND OF THE INVENTION

Control pedals are typically provided in a motor vehicle, such as an automobile, which are foot operated by the driver. Separate control pedals are provided for operating brakes and an engine throttle. When the motor vehicle has a manual transmission, a third control pedal is provided for operating a transmission clutch. A front seat of the motor vehicle is typically mounted on tracks so that the seat is forwardly and rearwardly adjustable along the tracks to a plurality of positions so that the driver can adjust the front seat to the most advantageous position for working the control pedals.

This adjustment method of moving the front seat along the tracks generally fills the need to accommodate drivers of various size, but it raises several concerns. First, this adjustment method still may not accommodate all drivers due to very wide differences in anatomical dimensions of drivers. Second, the necessary position of the seat may be uncomfortable for some drivers. Therefore, it is desirable to have an additional or alternate adjustment method to accommodate drivers of various size.

Many proposals have been made to selectively adjust the position of the control pedals relative to the steering wheel and the front seat in addition to adjusting the front seat in order to accommodate drivers of various size. These adjustable control pedals can actuate either a cable which is connected to an engine throttle, for example, or an electronic throttle control (ETC) where an electric signal is sent to the engine throttle which is proportional to the positioning of the pedal. Such "drive-by-wire" ETC pedals were adapted from fly-by-wire" aircraft pedals, and the ETC can be, for example, either a dual slope potentiometer where the electric signal is proportional to rotation of the pedal, or a linear variable displacement transducer (LVDT) where the electric signal is proportional to linear displacement of the pedal or a carrier operatively connected to the pedal. See, for example, U.S. Pat. No. 5,056,742 to Sakurai showing adjustable pedals which control brakes and rudders of a motor vehicle such as an aircraft. A mounting frame or carrier is mounted in a base frame or support structure so that the carrier can be adjusted forward or rearward by operation of a screw device or drive assembly. Pedals are pivotally connected directly to the multi-part carrier for pivotal movement relative to the carrier and are moved to various adjusted positions with the forward/rearward movement of the carrier relative to the support structure. Transducers or generator means are mounted on the carrier and move with the carrier to the various adjusted positions. These transducers have outputs responsive to the pivotal movement of the pedals relative to the carrier which vary in magnitude in proportion to the extent of movement of the pedals relative to the carrier. It is readily apparent to those skilled in the art of adjustable control pedals that the pedals connected to the carrier can have many different forms depending on the requirements of the particular motor vehicle such as, for example, in automobiles the pedal is typically in the form of a pedal arm extending from a pivot connection to a lower end having a pad.

U.S. Pat. Nos. 5,632,183, 5,697,260, 5,722,302, 5,819,593, 5,937,707, and 5,964,125, the disclosures of which are expressly incorporated herein in their entirety by reference, each disclose an example of an adjustable control pedal assembly. This control pedal assembly includes a hollow guide tube, a rotatable screw shaft coaxially extending within the guide tube, a nut in threaded engagement with the screw shaft and slidable within the guide tube, and a control pedal rigidly connected to the nut. The control pedal is moved forward and rearward when an electric motor rotates the screw shaft to translate the nut along the screw shaft within the guide tube. While this control pedal assembly may adequately adjust the position of the control pedal to accommodate drivers of various size, this control pedal assembly is relatively complex and expensive to produce. The relatively high cost is particularly due to the quantity of high-precision machined parts such as, for example, the guide tube and due to the quantity of welded joints.

U.S. Pat. Nos. 3,643,525 and 3,643,524, the disclosures of which are expressly incorporated herein in their entirety by reference, each disclose an example of an adjustable control pedal assembly which is much less expensive to produce. This control pedal assembly includes an upper arm having a single horizontal slot, a rotatable screw shaft attached to the upper arm and extending along the slot, a nut in threaded engagement with the screw shaft and having a pin slidable within the slot, and a control pedal rigidly connected to the nut. The control pedal is moved forward and rearward when an electric motor rotates the screw shaft to translate the nut along the screw shaft. While this control pedal assembly may adequately adjust the position of the control pedal to accommodate drivers of various size and is relatively inexpensive to produce, this control pedal is relatively unstable and can have a relatively large amount of lash. That is, components of the control pedal are subject to vibration during regular operation of the motor vehicle causing the components to rub or strike together causing undesirable noise.

While these adjustable pedal systems may adequately adjust the position of control pedals, these systems often do not know the exact location of the control pedal and/or can cause injury or damage when the control pedals engage an obstruction. Accordingly, there is a need in the art for an adjustable pedal assembly which selectively adjusts the position of the control pedal to accommodate drivers of various size, is relatively simple and inexpensive to produce, is able reset in order to identify the exact position of the control pedal, is able to detect when an obstruction is engaged during movement of the control pedal, and/or is highly reliable to operate.

SUMMARY OF THE INVENTION

The present invention provides an adjustable control pedal for a motor vehicle which overcomes at least some of the above-noted problems of the related art. According to the present invention, an adjustable pedal assembly comprises, in combination, a carrier, a lower arm supported by the carrier and operatively connected to the carrier for selected movement relative to the carrier, and a drive assembly operatively connected to the lower arm to selectively move the lower arm relative to the carrier. The drive assembly comprises a drive screw connected to one of the lower arm and the carrier, a drive nut connected to the other of the lower arm and the carrier and cooperating with the drive screw such that the drive nut travels along the drive screw upon rotation of the drive screw, and an electric motor operatively connected to the drive screw to selectively rotate the drive screw. A sensor is provided which is adapted to detect motion information upon rotation of the drive screw. A controller receives the motion information and is adapted to activate the electric motor upon initialization of the controller to move the lower arm in a first direction until a first mechanical stop is engaged and establish a home stop position and to move the lower arm in the other direction opposite the first direction until a second mechanical stop is engaged and establish a travel stop position. The home stop position and the travel stop position represent the mechanical limits of travel for the lower arm.

According to another aspect of the present invention, an adjustable pedal assembly comprises, in combination, a carrier, a lower arm supported by the carrier and operatively connected to the carrier for selected movement relative to the carrier, and a drive assembly operatively connected to the lower arm to selectively move the lower arm relative to the carrier. The drive assembly comprises a drive screw connected to one of the lower arm and the carrier, a drive nut connected to the other of the lower arm and the carrier and cooperating with the drive screw such that the drive nut travels along the drive screw upon rotation of the drive screw, and an electric motor operatively connected to the drive screw to selectively rotate the drive screw. A sensor is provided which is adapted to detect motion information upon rotation of the drive screw. A controller is adapted to selectively activate the electric motor to move the lower arm, to receive the motion information, and to determine stall conditions of the lower arm based on the motion information during movement of the lower arm.

From the foregoing disclosure and the following more detailed description of various preferred embodiments it will be apparent to those skilled in the art that the present invention provides a significant advance in the technology and art of adjustable control pedal assemblies. Particularly significant in this regard is the potential the invention affords for providing a high quality, feature-rich, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 3:
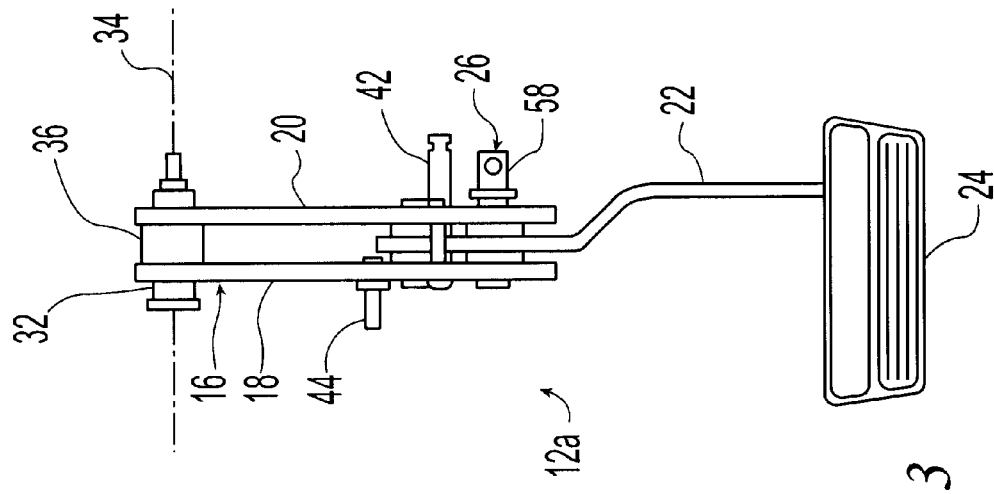
FIG. 3 is a rear elevational view of the first adjustable control pedal of FIG. 2.
Figure 2:
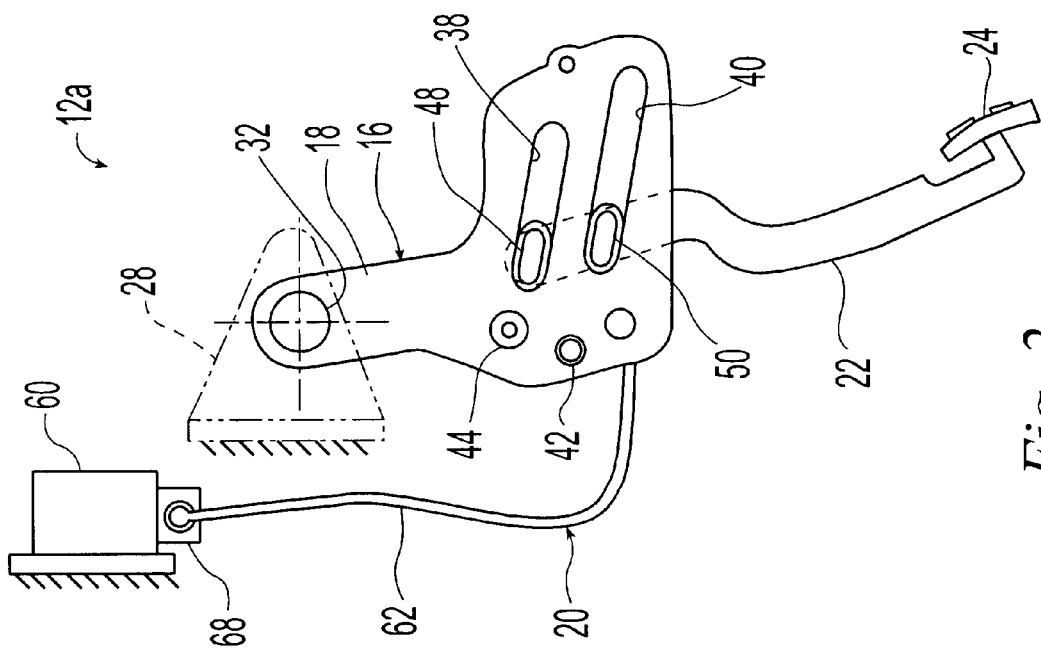
FIG. 2 is a left side elevational view of a first adjustable control pedal of the adjustable control pedal assembly of FIG. 1.
Figure 4:
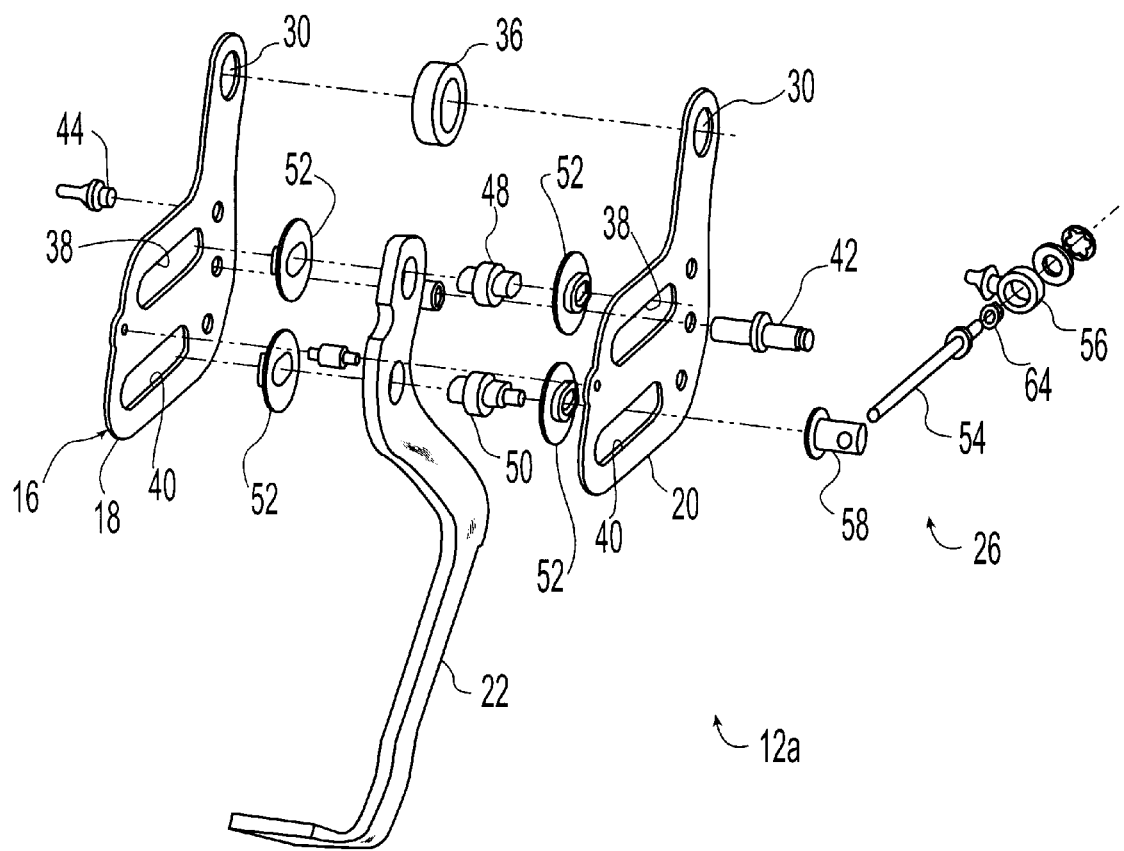
FIG. 4 is an exploded elevational view of the adjustable control pedal of FIGS. 2 and 3.
Figure 5:
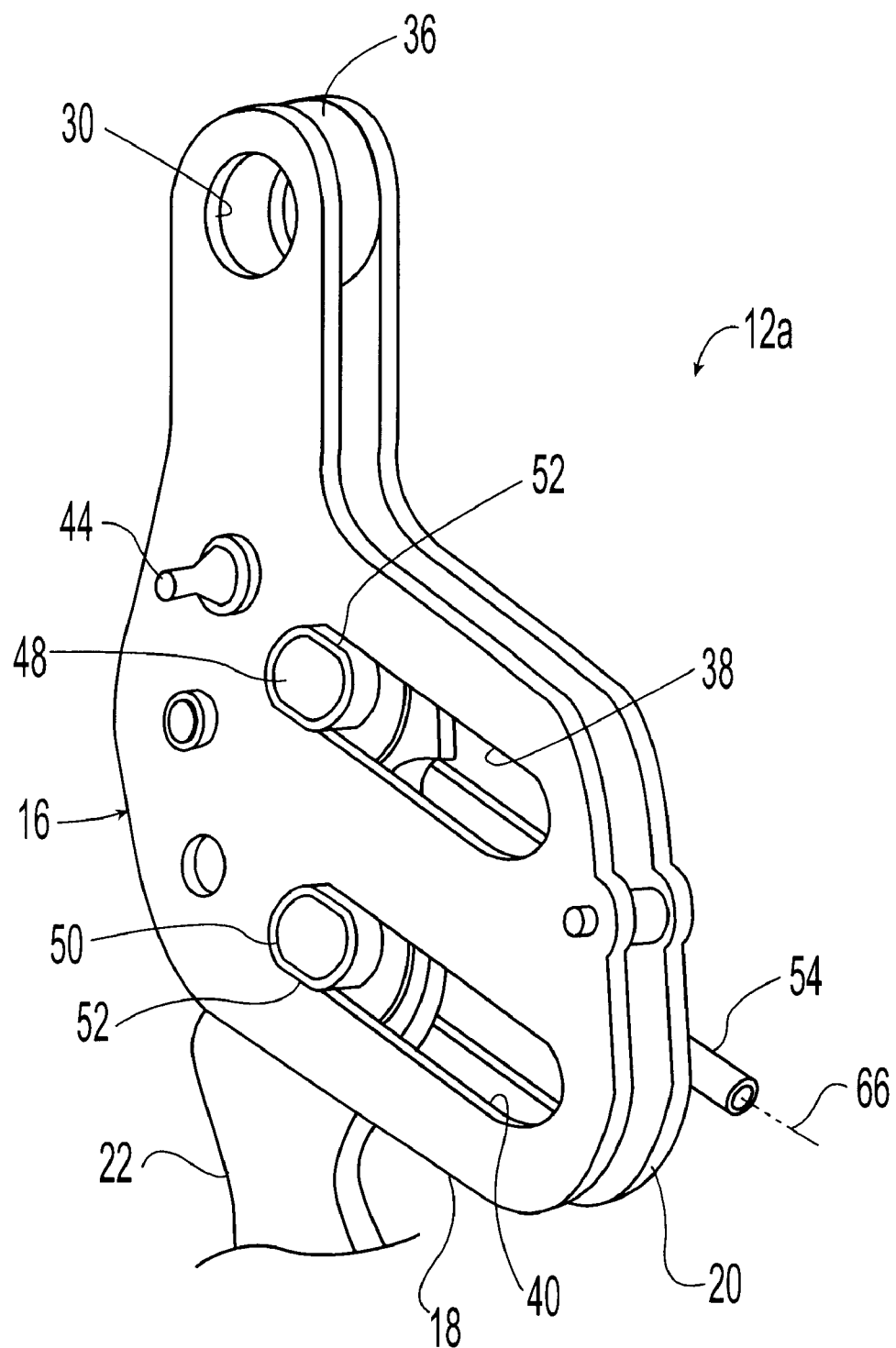
FIG. 5 is an enlarged left perspective view of an upper portion of the adjustable control pedal of FIGS. 2 to 4.
Figure 6:
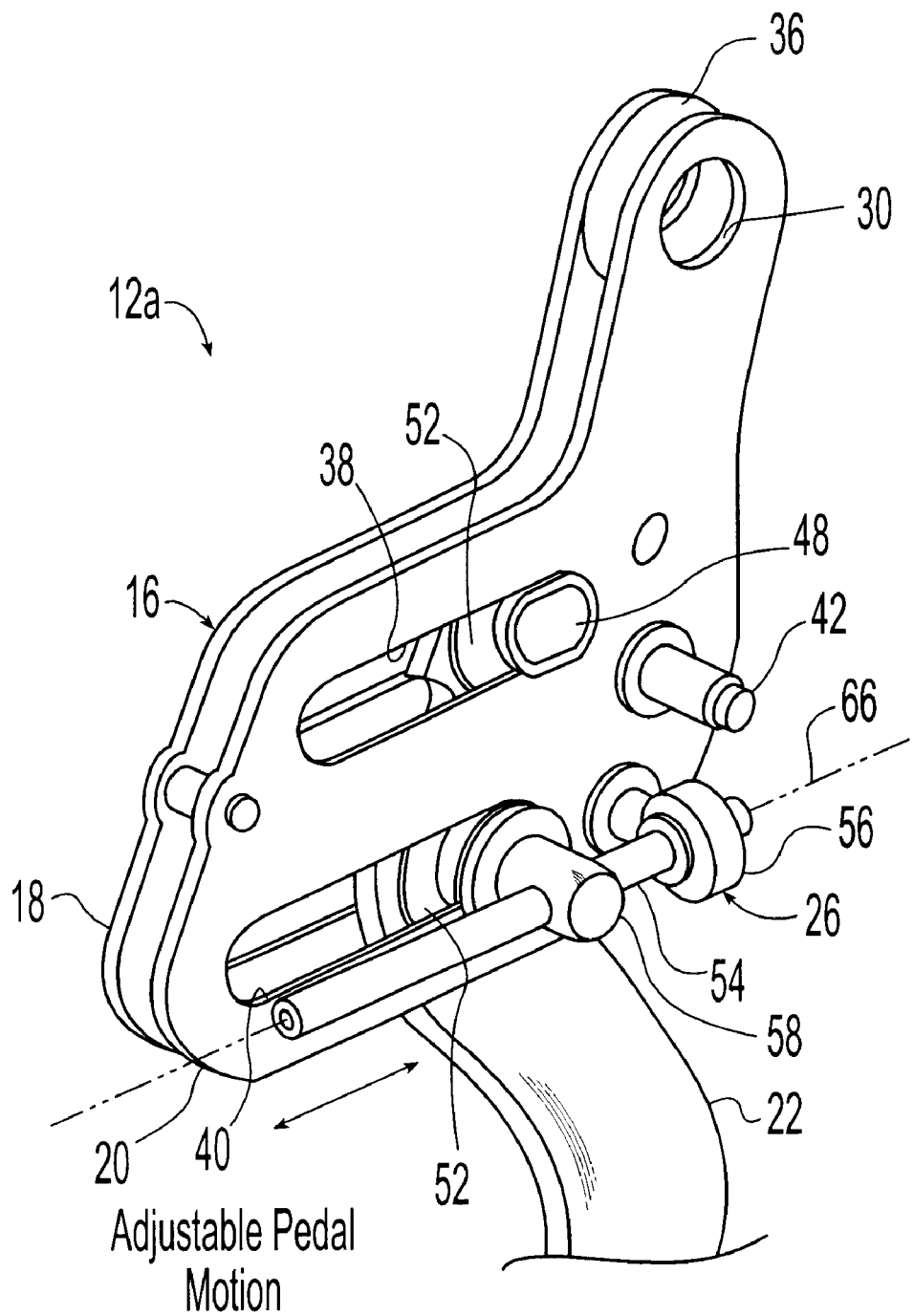
FIG. 6 is an enlarged right side perspective view of an upper portion of the adjustable control pedal of FIGS. 2 to 5.

It should be understood that the appended drawings are not necessarily to scale, presenting a somewhat simplified representation of various preferred features illustrative of the basic principles of the invention. The specific design features of an adjustable control pedal as disclosed herein, including, for example, specific dimensions, orientations, and shapes of the pedal arms and the slots will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the control pedal assembly illustrated in the drawings. In general, up or upward refers to an upward direction in the plane of the paper in FIGS. 2 and 3 and down or downward refers to a downward direction in the plane of the paper in FIGS. 2 and 3. Also in general, fore or forward refers to a direction toward the front of the motor vehicle, that is, to the left in the plane of the paper in FIG. 2 and aft or rearward refers to a direction toward the rear of the motor vehicle, that is, to the right in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved adjustable pedal assembly disclosed herein. The following detailed discussion of various alternative and preferred embodiments will illustrate the general principles of the invention with reference to an adjustable pedal assembly for use with a motor vehicle. Other embodiments suitable for other applications will be apparent to those skilled in the art given the benefit of this disclosure.

Figure 1:
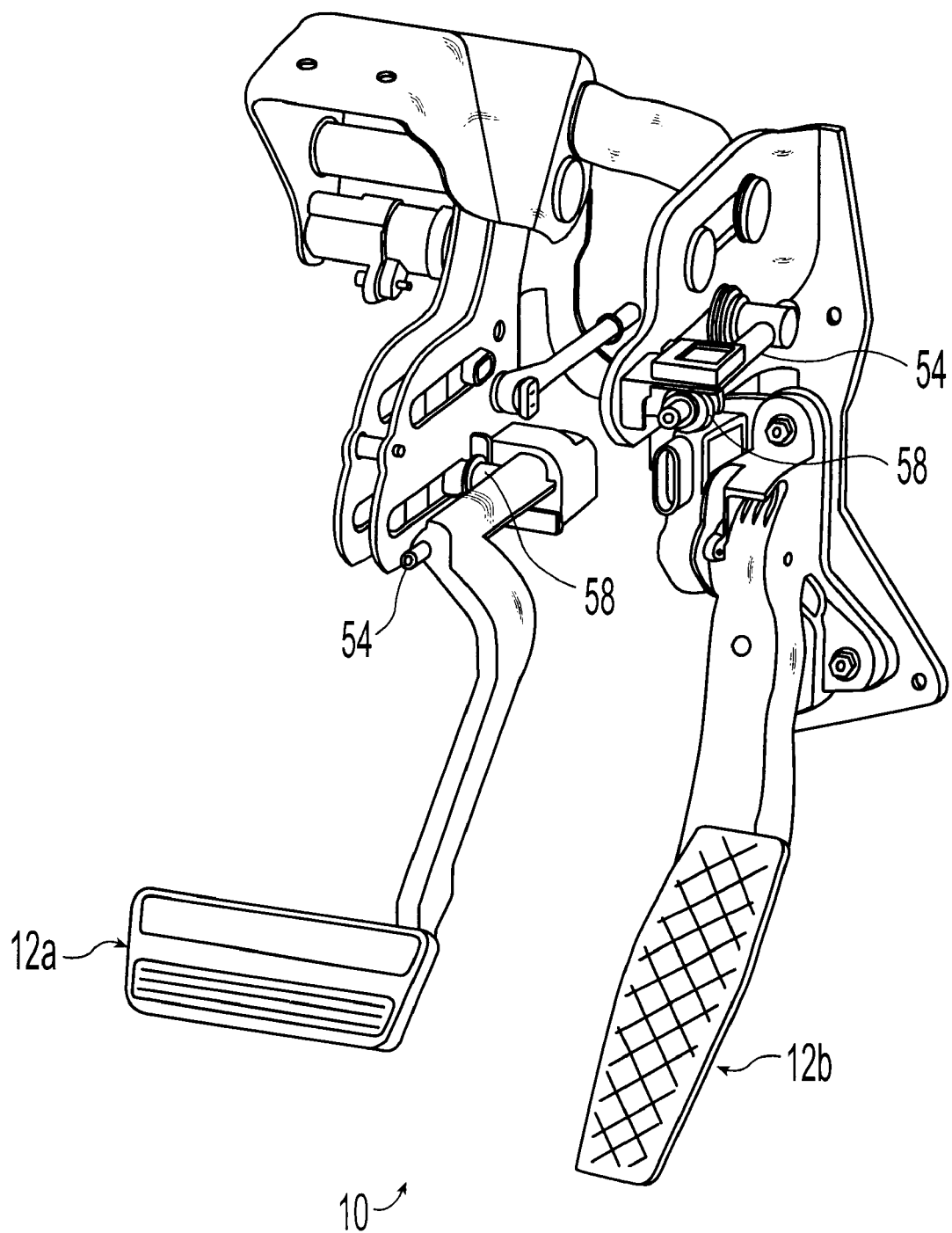
FIG. 1 is a perspective view of an adjustable pedal assembly according to a preferred embodiment of the present invention.

Referring now to the drawings, FIG. 1 shows an adjustable pedal assembly 10 for a motor vehicle, such as an automobile, according to a preferred embodiment of the present invention which has control pedals selectively adjustable to desired forward/rearward positions by an operator or driver of the motor vehicle. While the illustrated embodiments of the present invention are particularly adapted for use with an automobile, it is noted that the present invention can be utilized with any vehicle having at least one foot operated control pedal including trucks, buses, vans, recreational vehicles, earth moving equipment and the like, off road vehicles such as dune buggies and the like, air borne vehicles, and water borne vehicles.

Figure 1A:
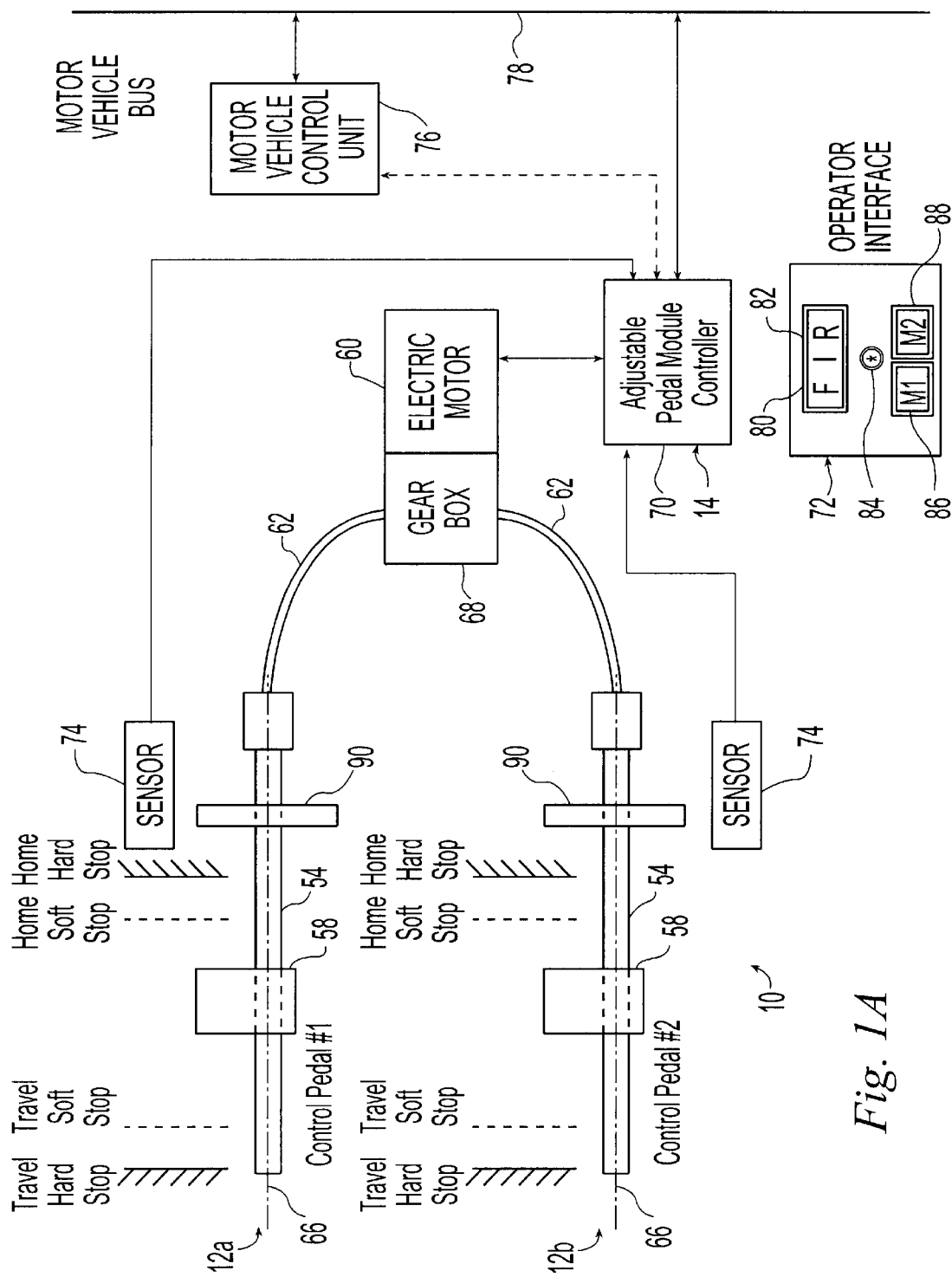
FIG. 1A is a schematic view of the adjustable pedal assembly of FIG. 1.

As best shown in FIGS. 1 and 1A, the illustrated adjustable pedal assembly 10 includes first and second adjustable control pedals 12a, 12b and a control system 14 for selectively adjusting the position of the control pedals 12a, 12b. Typically, the control pedals 12a, 12b are adapted as brake and accelerator pedals respectively. While the illustrated adjustable pedal assembly 10 includes two control pedals 12a, 12b, it is noted that the adjustable pedal assembly 10 can have a single control pedal within the scope of the present invention such as, for example, a single control pedal adapted as a clutch, brake or accelerator pedal. It is also noted that the adjustable pedal assembly 10 can have more than two control pedals 12 within the scope of the present invention such as, for example, three control pedals adapted as clutch, brake and accelerator pedals. The control pedals 12a, 12b are selectively adjustable by the motor vehicle operator in a forward/rearward direction as described in more detail hereinafter. In multiple control pedal embodiments, the control pedals 10 are preferably adjusted together simultaneously to maintain desired relationships between the control pedals such as, for example, "step over", that is, the forward position of the accelerator pedal 12b relative to the brake pedal, 12a and "pedal angles", that is, the orientation of the contact surfaces of the pedal pads. It is noted however, that individual adjustment of a single control pedal 12a, 12b is within the scope of the present invention.

While only the first control pedal 12a, which is adapted as a brake pedal, is described in detail hereinbelow, the second control pedal 12b, which is adapted as an accelerator pedal, is generally the same except as noted herein and as apparent to those skilled in the art given the benefit of this disclosure. For a detailed description of other suitable adjustable control pedals 12a, 12b adapted as both brake and accelerator pedals, see, for example, U.S. patent application Ser. No. 564,355, the disclosure of which is expressly incorporated herein in its entirety by reference.

As best shown in FIGS. 2–6, the first control pedal 12a includes an upper pedal arm or carrier 16 having first and second plates or members 18, 20, a lower pedal arm 22 supported by the upper pedal arm 16 and carrying a pad or pedal 24 for engagement by the foot of the motor vehicle operator, and a drive assembly 26 for moving of the lower pedal arm 22 relative to the upper pedal arm 16 to adjust the forward/rearward position of the pedal 24. The upper pedal arm 16 is sized and shaped for pivotal attachment to a mounting bracket 28. The mounting bracket 28 is adapted to rigidly attach the adjustable control pedal 12 to a firewall or other rigid structure of the motor vehicle in a known manner. The upper pedal arm 16 is adapted for pivotal attachment to the mounting bracket 28. The illustrated first and second members 18, 20 of the upper pedal arm 16 each have an opening 30 formed for cooperation with the mounting bracket 28 and an axle or pivot pin 32. With the pivot pin 32 extending through the mounting bracket 28 and the openings 30 of the first and second members 18, 20, the upper pedal arm 16 is pivotable relative to the fixed mounting bracket 28 about a horizontally and laterally extending pivot axis 34 formed by the central axis of the pivot pin 32. A spacer 36 is preferably provided about the pivot pin 32 between the first and second members 18, 20 to maintain a desired distance between the first and second members 18, 20. The illustrated first and second members 18, 20 of the upper pedal arm 16 are substantially identical and are rigidly connected together to pivot together about the pivot pin 32 in unison.

The lower portion of the first and second members 18, 20 is adapted for supporting the lower pedal arm 22 and for selected fore and aft movement of the lower pedal arm 22 relative to the first and second members 18, 20 along the lower portion as described in more detail hereinafter. The illustrated lower portion has a pair of vertically spaced apart elongate openings or slots 38, 40 formed therein which generally extend in a forward/rearward direction along the length of the lower portion. The illustrated slots 38, 40 are each substantially straight. Preferably, the drive or lower slot 40 is offset rearward of the guide or upper slot 38 but overlapping the upper slot 38. The lower portion is substantially planar or flat at least in the areas adjacent the slots 38, 40 and the slots 38, 40 are open laterally through the entire thickness of the first and second members 18, 20. The slots 38, 40 are sized and shaped for cooperation with the lower pedal arm 22 for substantially linear forward/rearward movement of the pedal 24 relative the upper pedal arm 16 over a desired adjustment range, such as about three inches, as described in more detail hereinbelow. It is noted that the separate upper and lower slots 38, 40 can alternatively be separate portions of a single slot such as a "C-shaped", "S-shaped", or other nonlinear slot.

The upper pedal arm 16 is operatively connected to a control device such as a clutch, brake or throttle such that pivotal movement of the upper pedal arm 16 about the pivot axis 34 operates the control device in a desired manner. The upper pedal arm 16 can be connected to the control device by, for example, a push-pull or Bowden cable for mechanical actuation or by a sensor or electrical wire or cable for electronic actuation. The illustrated upper pedal arm 16 is provided with a booster pin 42 for connection to the control device by a mechanical actuator. The illustrated upper pedal arm 16 is also provided with a switch pin 44 for connection to a switch for indicator lights such as brake lights so that the indicator lights indicate actuation of the pedal, that is, pivotal movement about the pivot axis 34, of the control pedal 12 by the operator.

The upper and lower pedal arms 16, 22 are preferably formed of a suitable metal such as steel but one or both can alternatively be formed of other suitable materials such as, for example, plastics like NYLON, aluminum, or magnesium. The illustrated lower pedal arm 22 is formed of an elongate plate oriented in a vertical plane substantially parallel to planes of the first and second members 18, 20. The upper end of the lower pedal arm 22 is adapted for movement relative to the upper pedal arm 16 between first and second members 18, 20 and along the upper and lower slots 38, 40. The upper end of the lower pedal arm 22 is provided with upper and lower guide pins or blocks 48, 50 laterally and horizontally extending therefrom to cooperate with the slots 38, 40 of the first and second members 18, 20 to form four sliding pin-and-slot connections for linearly moving the lower pedal arm 22 relative to the upper pedal arm 16. The lower end of the lower pedal arm 22 is sized and shaped to carry the rearward-facing pedal 24. The pedal 24 is adapted for depression by the driver of the motor vehicle to pivot the control pedal 12 about the pivot axis 34 to obtain a desired control input to the motor vehicle through the movement of the booster pin 42. It is readily apparent to those skilled in the art that the pedal arm 22 can be comprised of plastic or metal, and that the pedal arm 22 can be of unitary construction with the pedal or pad 24 or, alternatively, can have a pad support at its lower end to receive the pedal or pad 24 so that the pad 24 can be comprised of rubber or other suitable material for foot comfort.

Bushings 52 preferably encircle end portions of the guide pins 48, 50 and extend within the slots 38, 40. The bushings 52 are sized and shaped to closely conform with the guide pins 48, 50, particularly at the engagement surfaces contacting the edges of the slots 38, 40. The guide pins 48, 50 and the bushings 52 are sized and shaped so that there is very little or no vertical movement or "play" for the guide pins 48, 50 within the slots 38, 48. Flanges of the bushings 52 are preferably sized to extend between the lower pedal arm 22 and the first and second members 18, 20 so that there is very little or no lateral movement or "play" for the lower pedal arm 22 between the first and second members 18, 20. The bushings 52 are preferably formed of a suitable plastic or polymer material but can alternatively be any other type of suitable wear resistant and/or low friction material.

The drive assembly 26 includes a screw shaft or drive screw 54, a drive screw attachment or housing 56 for securing the drive screw 54 to the upper pedal arm 16, a drive nut 58 adapted for movement along the drive screw 54 in response to rotation of the drive screw 54, an electric motor 60 for rotating the drive screw 54, and a drive cable 62 for operatively connecting the electric motor 60 to the drive screw 54 and transmitting rotational motion and torque thereto.

The drive screw 54 is an elongate shaft having a threaded portion adapted for cooperation with the drive nut 58. The drive screw 54 is preferably formed of metal such as, for example, steel but can be alternately formed of a plastic resin such as, for example, NYLON. The forward end of the drive screw 54 is journaled by the drive screw housing 56 for rotation of the drive screw 54 about its longitudinal axis by the electric motor 60. The drive screw 54 rearwardly extends from the drive screw housing 56 generally parallel to and adjacent the lower slots 38 in the first and second members 18, 20 in a cantilevered fashion. Mounted in this manner, the drive screw 54 is generally horizontal. The illustrated drive screw 54 is provided with a bushing 64 for connection to the housing 56 to form a relatively fixed rotating joint. The drive screw 56 can alternatively be connected to the drive screw housing 56 with a self-aligning or freely pivoting rotating joint, that is, a joint which freely permits pivoting of the drive screw 54 relative to the drive screw housing 56 and the first and second members 18, 20 about at least axes perpendicular to the drive screw rotational axis 66. The self-aligning joint automatically corrects misalignment of the drive screw 54 and/or the drive nut 58. The self-aligning joint also allows the lower slot 40 to be nonlinear when desired. The self aligning joint can be, for example, a ball/socket type joint.

The drive screw housing 56 is sized and shaped for supporting the forward end of the drive screw 54 and attaching the drive screw 54 to the first and second members 18, 20. The drive screw housing 56 is preferably molded of a suitable plastic material such as, for example, NYLON but can alternatively be formed of metal such as steel. The illustrated drive-screw housing 56 is secured to the upper pedal arm 16 with a snap-fit connection. It is noted, however, that the drive screw housing 56 can be secured to the upper pedal arm 16 in other suitable manners such as, for example, welding, staking, or mechanical fasteners.

The drive nut 58 is adapted for axial movement along the drive screw 54 in response to rotation of the drive screw 54. The drive nut 58 is preferably molded of a suitable plastic material such as, for example, NYLON but can alternatively be formed of metal such as, for example steel. The illustrated drive nut 58 is rigidly secured to the lower guide pin 50. The lower guide pin 50 can be alternatively connected to the drive nut 58 with a self-aligning or freely pivoting joint, that is, a joint which freely permits pivoting of the drive nut 58 relative to the lower guide pin 50 about at least axes perpendicular to the rotational axis 66 of the drive screw 54. The self-aligning joint automatically corrects misalignment of the drive nut 58 and/or the drive screw 54. The self aligning joint can be, for example, a ball/socket type joint.

The electric motor 60 can be of any suitable type and can be secured to the firewall or other suitable location such as, for example, the mounting bracket 28. The drive cable 62 is preferably a flexible push-pull-type or Bowden cable and connects the output shaft of the electric motor 60 and the forward end of the drive screw 54 so that rotation of the electric motor 60 rotates the drive screw 54. It is noted that the drive screw 54 and the electric motor 60 can be alternatively connected with a rigid connection. It is noted that suitable gearing 68 is provided between the electric motor 60 and the drive screw 54 as necessary depending on the requirements of the adjustable pedal assembly 10. It is also noted that the fixed portion or sheath of the drive cable 62 is rigidly secured to the forward end of the drive screw housing 56 and a rotating portion or core of the drive cable 62 is operatively connected to the forward end of the drive screw 54 to rotate the drive screw 54 therewith. See U.S. patent application Ser. No. 09/492,238, the disclosure of which is expressly incorporated herein in its entirety by reference, for a more detailed description of a suitable drive screw, housing, and/or cable support. Also see U.S. patent application Ser. No. 09/642,975, the disclosure of which is expressly incorporated herein in its entirety by reference, for a more detailed description of the control pedal 12.

As best shown in FIG. 1, the control system 14 preferably includes a central processing unit (CPU) or controller 70 for operating the electric motor 60, an operator interface 72 for exchanging information between the driver and the controller 70, and at least one sensor 74 for detecting motion of the control pedals 12a, 12b and providing such motion information to the controller 70. The control system 14 forms a control loop wherein the controller 70 selectively activates and deactivates the electric motor 60. When activated, the electric motor 60 rotates the drive screws 54 through the drive cables 62. It is noted that while the drive screws 54 of the illustrated embodiment are connected to the electric motor 60 in parallel, they can alternatively be connected to the electric motor 60 in series. The sensor or sensors 74 detect movement of the control pedals 12a, 12b and send(s) signals to the controller 70 which enables the controller 70 to deactivate the electric motor 60 when movement to a desired position has been obtained.

The controller 70 includes processing means and memory means which are adapted to control operation of the adjustable pedal assembly 10 as described in detail herein. The controller 70 is preferably in communication with a motor vehicle control unit 76 through a local bus 78 of the motor vehicle or a direct connection so that motor vehicle information, such as ignition switch information, can be supplied to or examined by the controller 70 and status of the adjustable pedal assembly 10 can be supplied to or examined by the motor vehicle control unit 76. It is noted that while illustrated control system 14 utilizes a dedicated controller 70, the controller can alternatively be the motor vehicle control unit 76 or a controller of another system of the motor vehicle such as, for example, a keyless entry system or a powered seat system.

The illustrated operator interface 72 includes a forward button or switch 80, a reverse or rearward button or switch 82, an indicator device 84, and first and second memory buttons or switches 86, 88. When activated, the forward switch 80 sends control signals to the controller 70 to move the control pedals 12*a*, 12*b* in a forward direction. When activated, the reverse switch 82 sends control signals to the controller 70 to move the control pedals 12*a*, 12*b* in a rearward direction. The illustrated forward and rearward switches 80, 82 are a single rocker-type switch but can be other types of suitable switches such as, for example, push-button switches or toggle switches. The illustrated indicator device 84 is an indicator or status light such as an LED which is selectively illuminated to convey information to the operator. It is noted that the indicator device 84 can alternatively be other suitable types of devices which can convey information such as, for example, an LED or LCD display. When activated, the memory switches 86, 88 send control signals to the controller 70 to move the control pedals 12*a*, 12*b* to preferred locations previously saved in memory of the controller 70. Preferably, when activated and held for a predetermined period of time, such as about two seconds, the controller 70 saves the current position in memory so that subsequent actuation of that memory switch 86, 88 will send a control signal to the controller 70 to move the control pedals 12*a*, 12*b* to the current location. Preferably, the indicator device 84 acknowledges the saving of the current position by for example, blinking the indicator light for a predetermined period of time. The illustrated memory switches 86, 88 are a single push-button switches but can be other types of suitable switches such as, for example, toggle switches. It is noted that the operator interface 72 can also include other control switches when desired such as, for example, a lock out button or switch which when activated sends control signals to deactivate the system and prevent movement of the control pedals 12*a*, 12*b* and/or an override button or switch which when activated permits the control pedals 12*a*, 12*b* to be moved by the driver in a desired manner regardless of existing conditions.

Figure 1C:
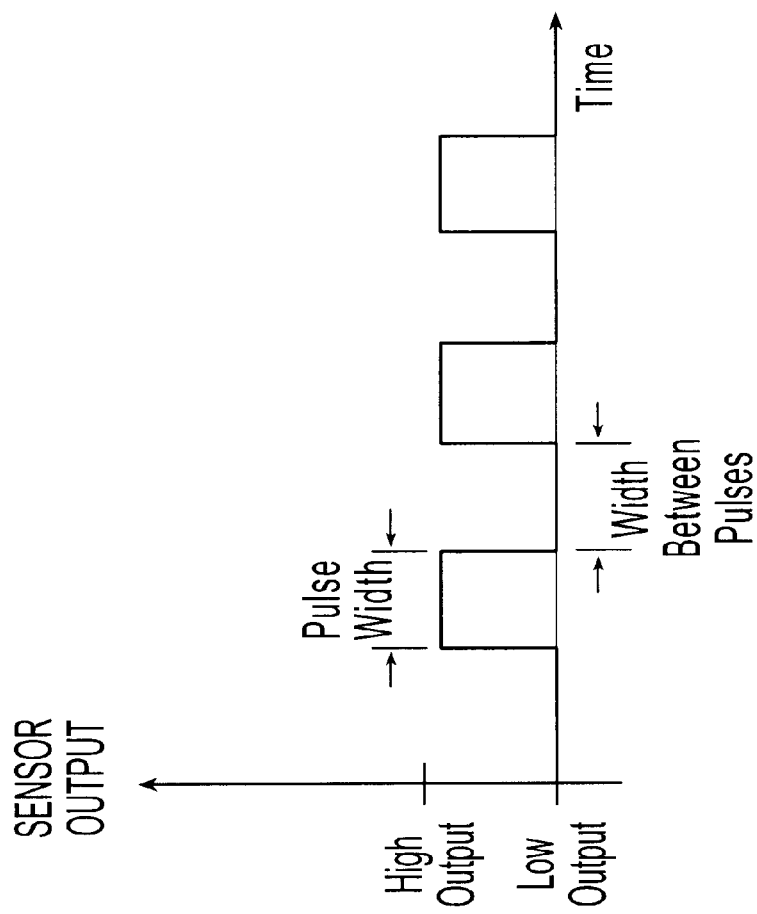
FIG. 1C is a graph showing output of the hall-effect sensor of FIG. 1B over time.
Figure 1B:
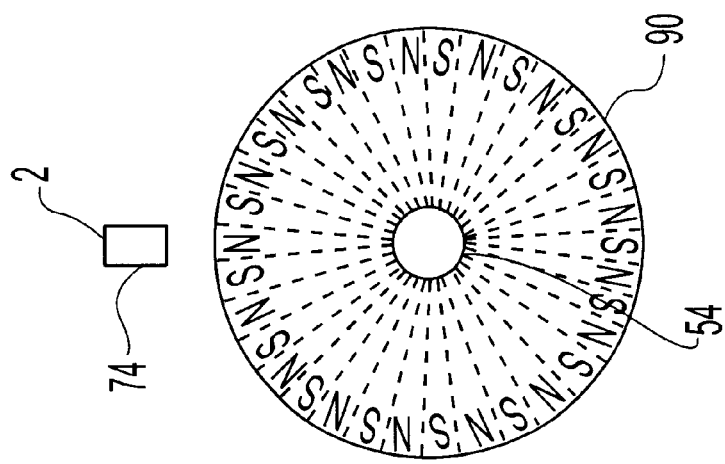
FIG. 1B is a schematic end view of a hall-effect switch and ring magnet of FIG. 1A.

The illustrated embodiment provides each control pedal 12*a*, 12*b* with a sensor 74 to detect movement of the control pedals 12*a*, 12*b* and send signals relating to such movement information to the controller 70. Alternatively, a single sensor 74 or more than two sensors 74 can be utilized. The illustrated sensors 74 are located adjacent the drive screws 54 and are adapted provide movement information, in the form of distance and speed information, to the controller 70. The sensors 74 are preferably hall-effect switches mounted adjacent ring magnets 90. As best shown in FIG. 1B, each ring magnet 90 comprises a predetermined number of north and south poles such as, for example, a total of about 24 to 34 north and south poles. It is noted, however, that a ring magnet with any number of poles can be used. The ring magnet 90 is mounted for rotation with the drive screw 54 so that the predetermined number of magnet poles pass the sensor 74 each revolution of the drive screw 54. During rotation of the drive screw 54, the sensor 74 provides a square wave pulse stream to the controller 70. As best shown in FIG. 1C, the width of each pulse indicates the time one type of magnet pole was adjacent the sensor 74 and the width between pulses indicates the time the other type of magnet pole was adjacent the sensor. Therefore, width of the pulses and width between pulses proportionally decreases as rotational velocity of the drive screw 54 increases. Speed can be determined by pulse width, width between pulses, or preferably by both pulse width and width between pulses. The distance the drive nut 58, and thus the lower pedal arm 22, travels with each rotation of the drive screw 54 is preprogrammed in the controller 70. Therefore, the controller 70 can determine both the location and speed of the lower pedal arms 22 from the movement information received from the sensors 74. This motion information is used by the controller 70 in many ways as described in detail hereinbelow.

It is noted that other suitable sensors can be alternatively utilized such as, for example, a potentiometer. The sensors 74 can alternatively be position sensors such as, for example, a linear hall-effect sensor and/or a linear potentiometer. The sensors 74 can also alternatively be a current shunt on the electric motor 60 providing motor commutator pulses to detect position or motor current. Therefore, it is noted that the sensors 74 can alternatively have other locations such as, for example, between the upper and lower pedal arms 16, 22 and/or at the electric motor 60. Other motion information sensors 74 and locations for the sensors 74 will be apparent to those skilled in the art given the benefit of this disclosure.

The motion information from the sensors 74 can be utilized to automatically stop the control pedals 12*a*, 12*b* at ends of travel along the drive screw 54. The controller 70 is preferably adapted to stop the motor 60 when motion information indicates that the drive nut 58 has reached a predetermined end of travel along the drive screw 54 prior to engaging a "hard" or mechanical stop or abutment. The position of the "soft" or electronic stop points relative to the hard stop points at the end of travel are preferably preprogrammed or determined by the controller 70. When the controller 70 determines that the control pedals 12*a*, 12*b* have reached the soft or electronic stop points, the controller 70 stops the motor 60 and thus movement of the drive nuts 58 along the drive screws 54. Fore-aft movement of the lower pedal arms 16, therefore, is electronically stopped without engaging mechanical stops and resulting stress on the motor 60 and mechanical components. When a hard stop is engaged, the motor 60 stalls and current increases which may cause overheating of the motor 60 and a resulting shortened life of the motor 60. It is noted, however, that the adjustable pedal assembly 10 is preferably provided with hard stops for limiting travel of the drive nuts 58 beyond the soft stops for use in initializing or resetting the system 14 an use in the event of a failure of the soft stops. In the illustrated embodiment, the hard stops include the ends of the upper and lower slot 38, 40 which form abutments which are engaged by the upper and lower guide pins 48, 50 at the end of travel along the slots 38, 40 to limit fore-aft movement of the lower arms 16 and axial movement of the drive nuts 58.

The motion information from the sensors 74 can be utilized by the controller 70 to move the control pedals 12*a*, 12*b* to desired positions. Because each pulse of the sensor output indicates a predetermined distance traveled, the total number of pulses indicates the total distance traveled. Therefore, by setting a home position at zero pulses, every other position along the travel length can be defined by a number of pulses from the home position. The current position therefore can be identified by the controller 70 which keeps track of the cumulative effect of all of the pulses which have occurred since traveling from the home position. In the illustrated embodiment, the home or forward soft stop is set as zero pulses and the travel or rearward soft stop is set as the total number of pulses from the home soft stop. In this manner, the current position can be stored by storing the number of pulses that the current position is away from the home position.

The motion information from the sensors 74 can be utilized to detect an obstruction in the path of at least one of the control pedals 12*a*, 12*b* such as, for example, the operator's foot. A potential "pinch" situation is detected if signals from the sensors 74 to the controller 70 indicate that there is a stall condition, by change in speed, acceleration or the like, which indicates that an obstruction has been engaged by at least one of the control pedals 12a, 12b. If the sensors 74 detect a stall or obstruction, the controller 70 automatically stops the motor 60 and/or reverses direction of the movement for a predetermined distance or to the previous position to prevent injury to a person or damage to an object or the adjustable pedal assembly 10. If the sensors 74 indicate a second obstruction upon reversing direction, the controller 70 places the system in fault mode. Preferably the indicator device 84 identifies that the system 14 is in fault mode such as, for example, by blinking the indicator light.

Because each pulse width is a function of time (the width is the time to travel a predetermined distance), the pulse widths or velocity information can be utilized to detect a stalled or obstruction condition. In the illustrated embodiment, after a predetermined startup period which permits the system to reach full speed, such as about 6 to about 8 pulses, a time or pulse width is stored indicating a full speed pulse. The full speed pulse is determined each motion cycle to reduce the effect of long term degradations. During movement, each pulse width is compared to the stored full speed pulse width to determine if a stalled condition is beginning to take place. Preferably, an averaging algorithm is utilized wherein each pulse width (or some derivative of each pulse width) is compared to the sum of the stored full speed pulse width and a constant value. The constant value can be a fixed percentage, such as 50%, of the saved full speed pulse width. The fixed percentage is dependant on variables of the mechanical system and can be from about 10% to about 300%. Accordingly, each system must be tested to determine the optimum fixed percentage. If a measured pulse width is greater than the sum of the stored full speed pulse width and the constant value, there is an indication of a stall condition arising. Typically, more than one pulse width should indicate a stall condition arising before acting on the stalled condition depending on the desired sensitivity of the system 14.

The motion information from the sensors 74 can be utilized to return the control pedals 12a, 12b to a stored preferred location (a stored number of pulses from the home position) when selected by the driver. The driver adjusts the control pedals 12a, 12b to a preferred location and engages one of the memory switches 86, 88 for a predetermined period of time which is preferably verified by the indicator device 84, such as by a flash of the indicator light, so that the preferred location is saved in memory. At a later time, when the driver engages the same memory switch 86, 88 the controller 70 automatically activates the motor 60 to rotate the drive screws 54 and move the control pedals 12a, 12b from the current position (a known number of pulses from the home position) to the saved position (a stored number of pulses from the home position). The controller 70 automatically stops the motor 60 when the motion information from the sensors 74 that the necessary number of pulses, in the necessary direction, have occurred to reach the stored position.

Each control pedal 12a, 12b preferably includes a separate sensor 74 so that motion information is obtained regarding each of the drive screws 54. By having motion information regarding each drive screw 54, the controller 70 can identify when the control pedals 12a, 12b, are not moving in the same manner, that is maintaining the same relationship to each other. Preferably, the controller 70 deactivates the motor 60 if there is an indication that a predetermined relationship between two or more of the control pedals 12a, 12b is not maintained. For example, the predetermined relationship can be the step over of the brake and accelerator pedals. If the sensors 74 indicate a change in relationship between the control pedals 12a, 12b, the controller 70 places the system in fault mode. Preferably the indicator device 84 identifies that the system 14 is in fault mode such as, for example, by blinking the indicator light.

The controller 70 is preferably adapted to selectively trigger an initialization process to identify where the control pedals 12a, 12b are located. This initialization process can be utilized at start up after any loss of power, such as a battery change, and/or after a system shut down due to failure detection or fault mode. When the initialization process is triggered, the controller 70 activates the motor 60 to move the drive nuts 58 forward until they reach the forward or home hard stop. The controller 70 then reverses the motor 60 to move the drive nuts 58 in a rearward direction until they reach the rearward or travel hard stop. The controller 70 compares the distance between the located hard stops, or alternatively the determined soft stops, to determine if an artificial hard stop or obstruction was engaged. If the distance is adequate, the controller 70 sets the soft stops a predetermined distance from the located hard stops. If the distance is not adequate, that is it indicates an obstruction was engaged, the controller 70 places the system in fault mode. Preferably the indicator device 84 identifies that the system 14 is in fault mode such as, for example, blinking the indicator light.

It is noted that the LED can blink at different rates depending on the type of failure such as, for example, a one second rate for a step over failure, a two second rate for an initialization failure, a 0.25 second rate for a temporary fault in the circuit such as an H-bridge. Preferably, means are provided for resetting or initializing the system 14 when in fault mode such as, for example, a reset switch. In the preferred embodiment, the reset or initialization process is triggered by engaging the forward switch 80 and each of the memory switches 86, 88 simultaneously.

Figure 7A:
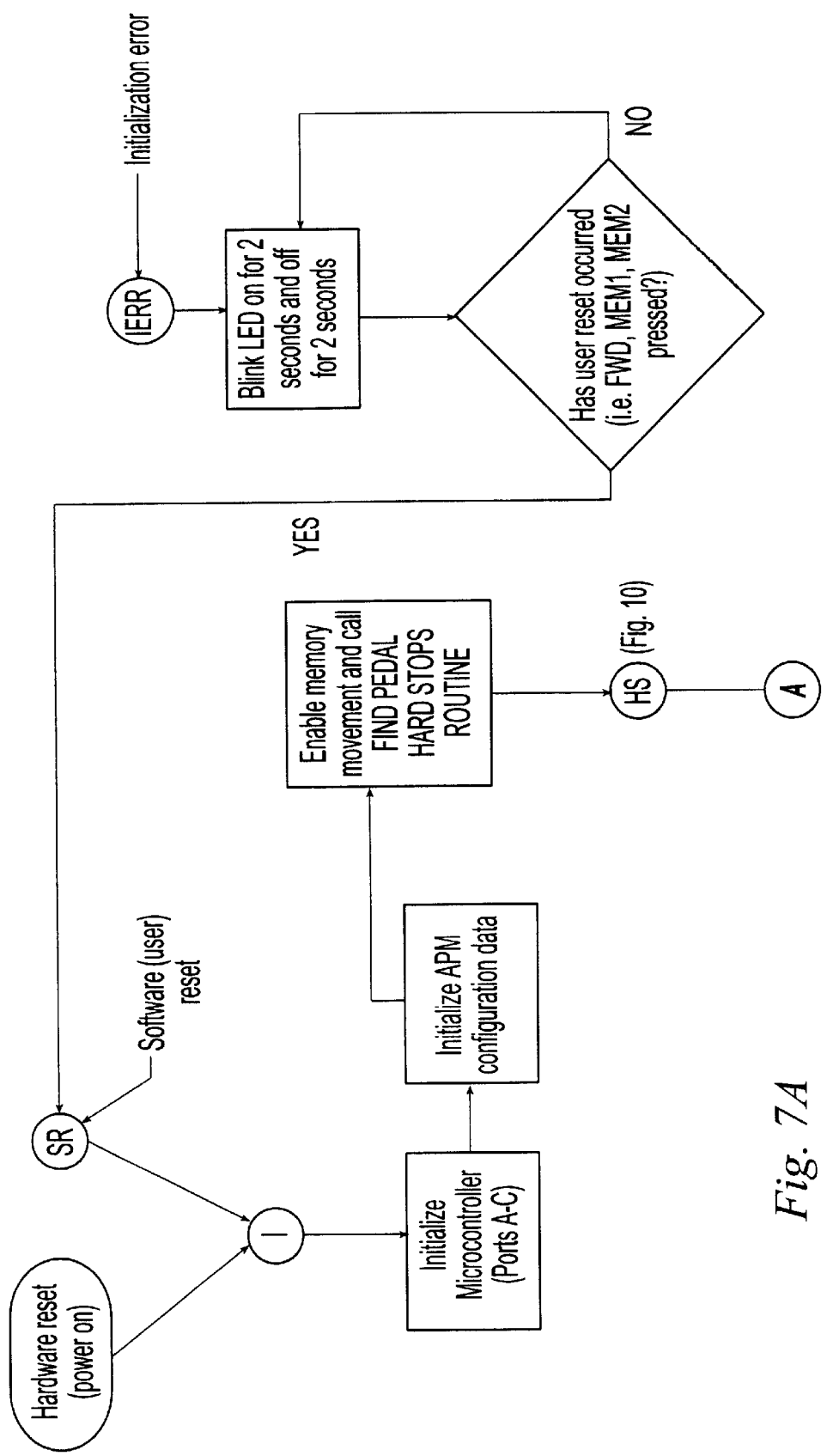
FIGS. 7A–C is a flowchart of a preferred initialization routine utilized by the controller of the adjustable pedal assembly of FIG. 1.

FIGS. 7A–13B illustrate flow charts for preferred operation of the controller 70. The initialization program loop or routine is best shown in FIGS. 7A–C. The controller 70 runs a "find pedal hard stops routine" when the initialization process is triggered. The find pedal hard stops routine is described in more detail hereinbelow with regard to FIG. 10. If the hard stops are not found, the system 14 is placed in fault mode and the LED light 84 is blinked at a predetermined rate such as two seconds on and two seconds off. If the hard stops are found, the soft stops are then determined by the controller 70. Preferably, the home soft stop location is determined by adding a predetermined distance (predetermined number of pulses) from the home hard stop. The travel soft stop is determined by subtracting the home soft stop location (number of pulses from the home hard stop) from the from the travel hard stop location (number of pulses from the home hard stop). The distance between the travel and home soft spots is compared to a predetermined distance to determine if an artificial hard stop or obstacle was engaged. If an obstacle was engaged, the system 14 is placed in fault mode and the LED light 84 is blinked at a predetermined rate such as two seconds on and two seconds off. If an obstacle was not engaged, stored memory positions for the memory switches 86, 88 are set to the home soft stop and the control pedals 12a, 12b are moved between the travel soft stop and the home soft stop. If a stall or obstruction is detected during this movement, the system 14 is placed in fault mode and the LED light 84 is blinked at a predetermined rate, such as two seconds on and two seconds off. If a stall or obstruction is not detected during this movement, the two pedal positions are set equal and the main program loop is initiated.

Figure 7B:
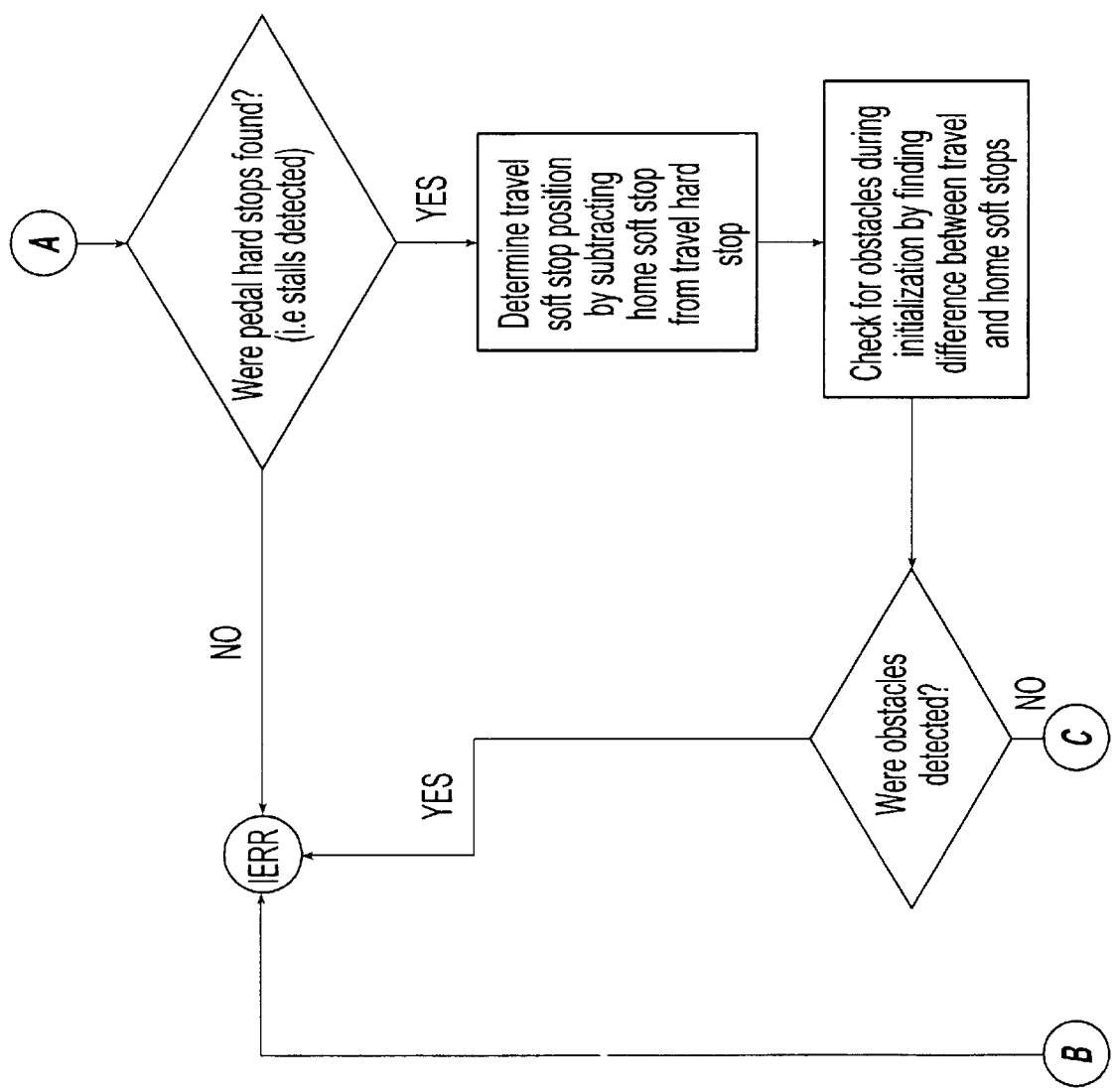
Figure 7C:
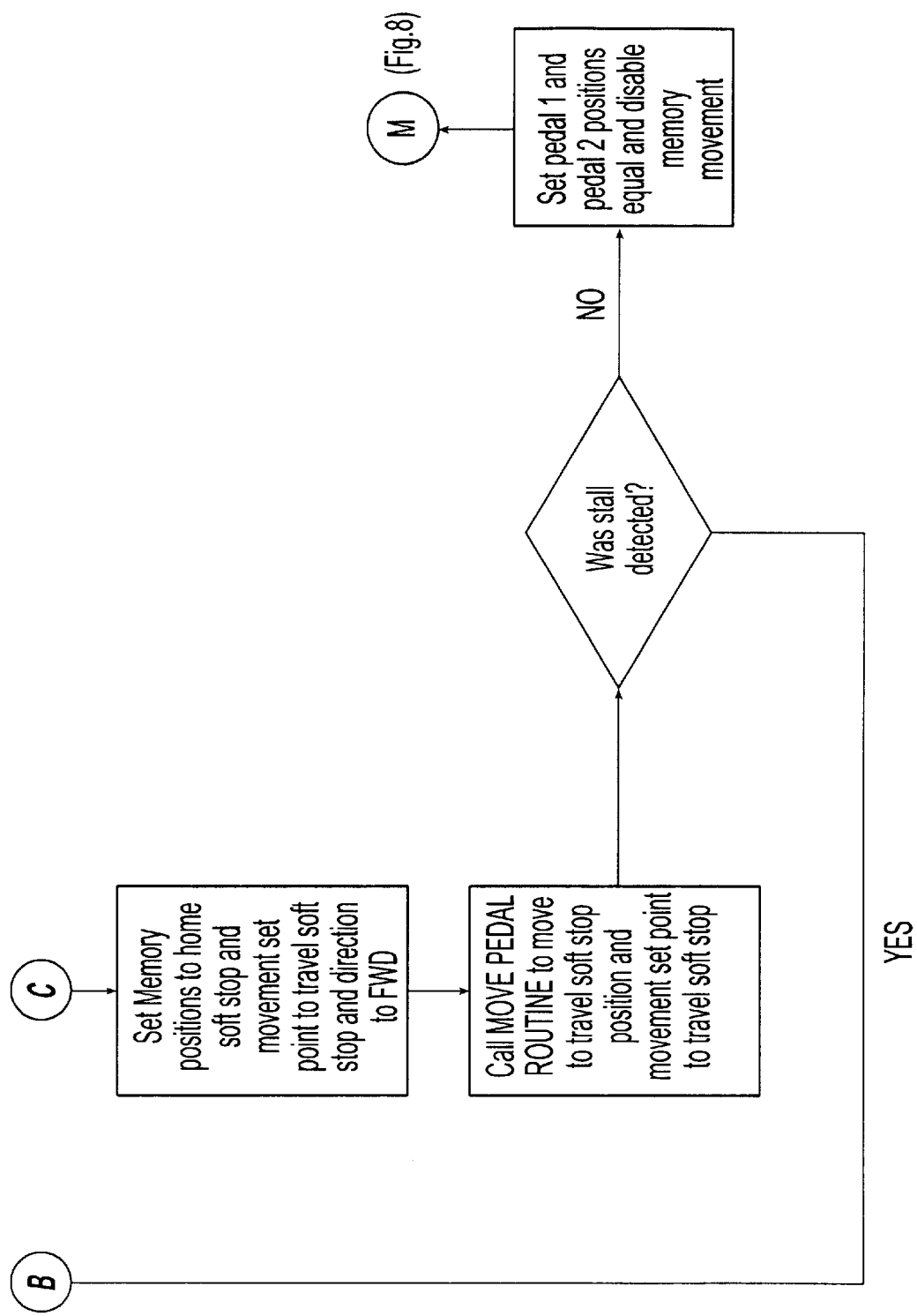
Figure 8A:
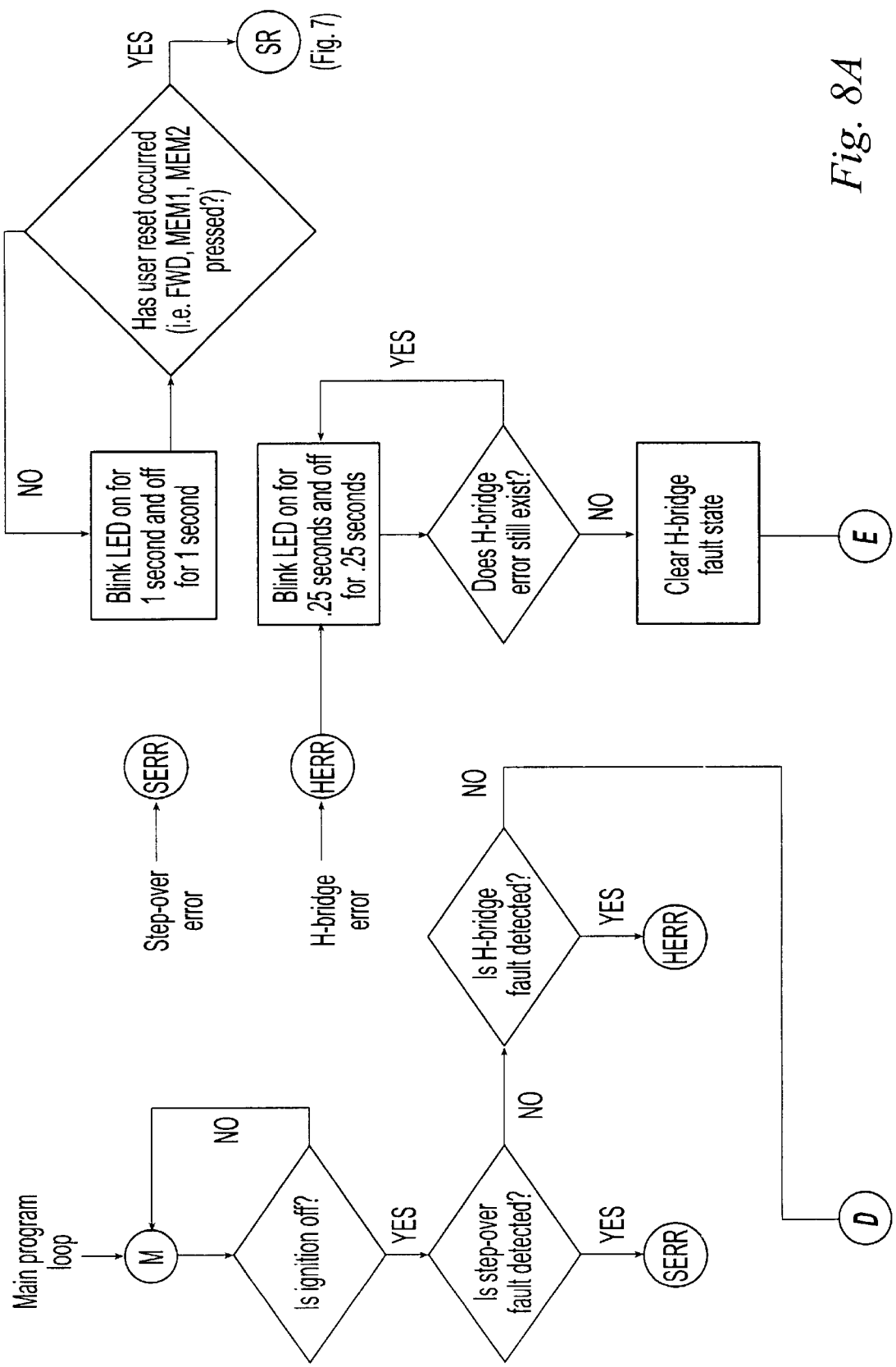
FIGS. 8A–C is a flowchart of a preferred main program loop utilized by the controller of the adjustable pedal assembly of FIG. 1.
Figure 8B:
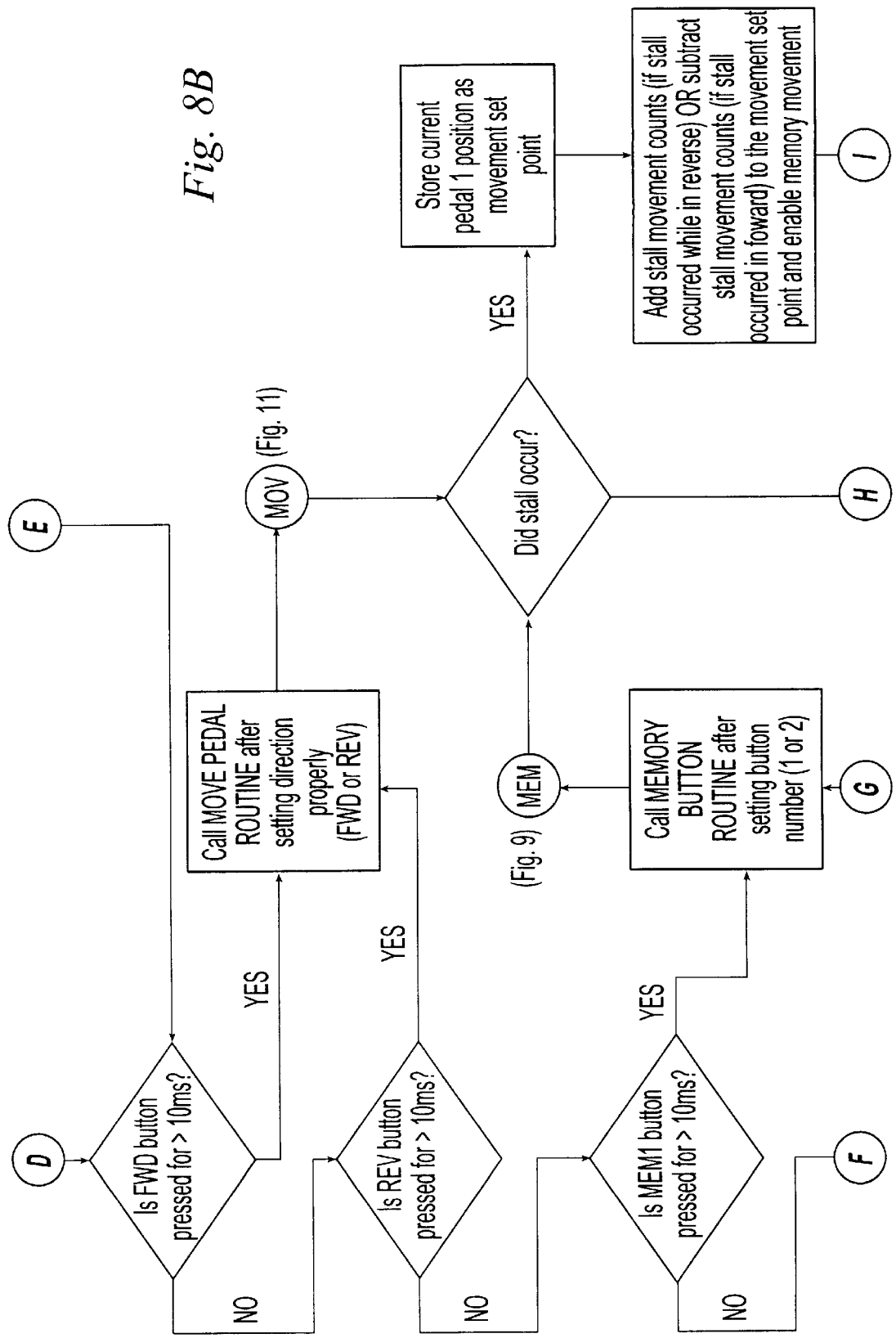
Figure 8C:
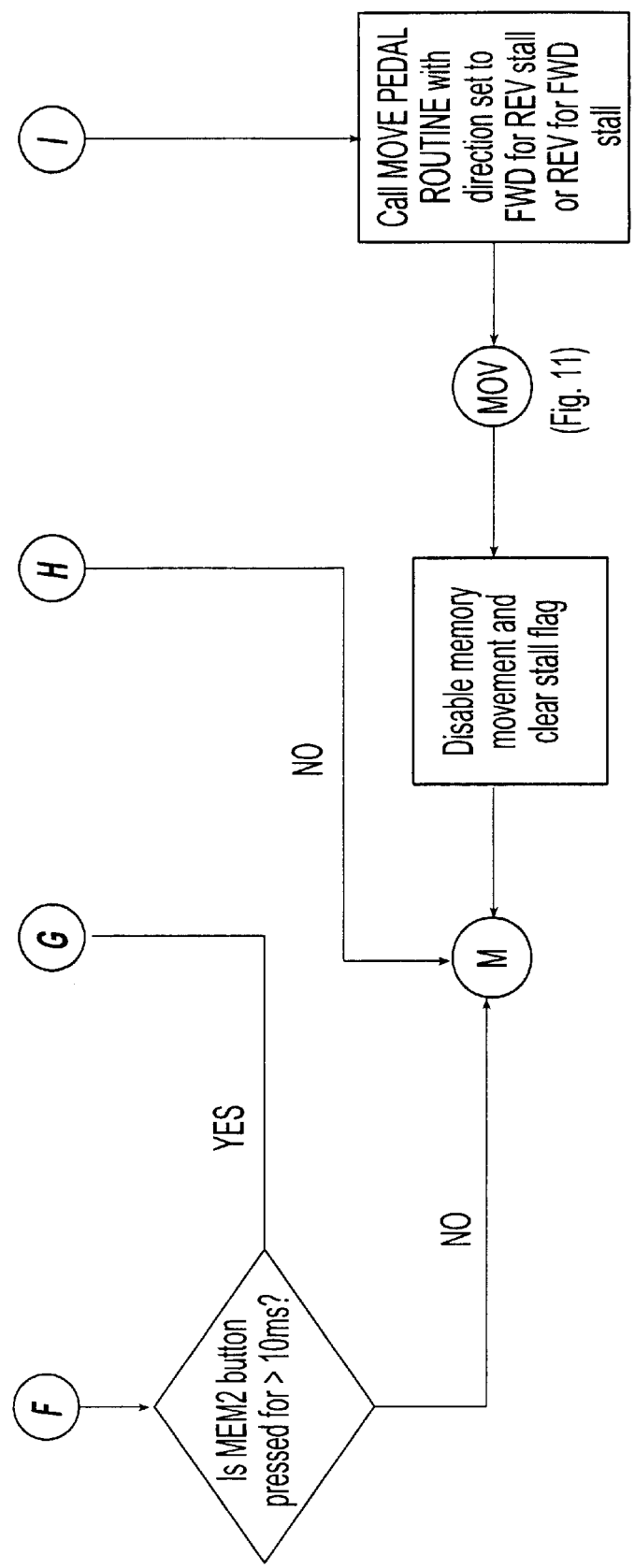

The main program loop is best shown in FIGS. 8A–C. When an ignition switch of the motor vehicle is detected to be off, the controller 70 checks for a step over fault condition (the two control pedals are no longer at equal positions). If a step over fault condition is determined, the system 14 is placed in fault and the LED light 84 is blinked at a predetermined rate such as one second on and one second off. If the user attempts to reset the system 14, the initialization process of FIGS. 7A–C is initiated. If a step over fault condition is not detected, the controller 70 checks for an H-bridge or circuit fault condition. If a circuit fault condition is determined, the system 14 is placed in fault and the LED light 84 is blinked at a predetermined rate such as a quarter of a second on and a quarter of a second off. The controller 70 continues to check if the condition remains and clears the fault state when the condition no longer exists. If a circuit fault condition is not detected and the forward switch 80 or the rearward switch 82 is pressed for at least a predetermined period of time, such as more than ten milliseconds, the move pedal routine (FIGS. 11A–C) is initiated after properly setting the direction to forward or rearward depending on which direction switch 80, 82 was pressed. If a circuit fault condition is not detected and the first memory switch 86 or the second memory switch 88 is pressed for at least a predetermined period of time, such as more than ten milliseconds, the memory button routine (FIGS. 9A–B) is initiated after properly setting the button number to 1 or 2 depending on which memory switch 86, 88 was pressed. After completing the memory routine, the move pedal routine is initiated.

Figure 9A:
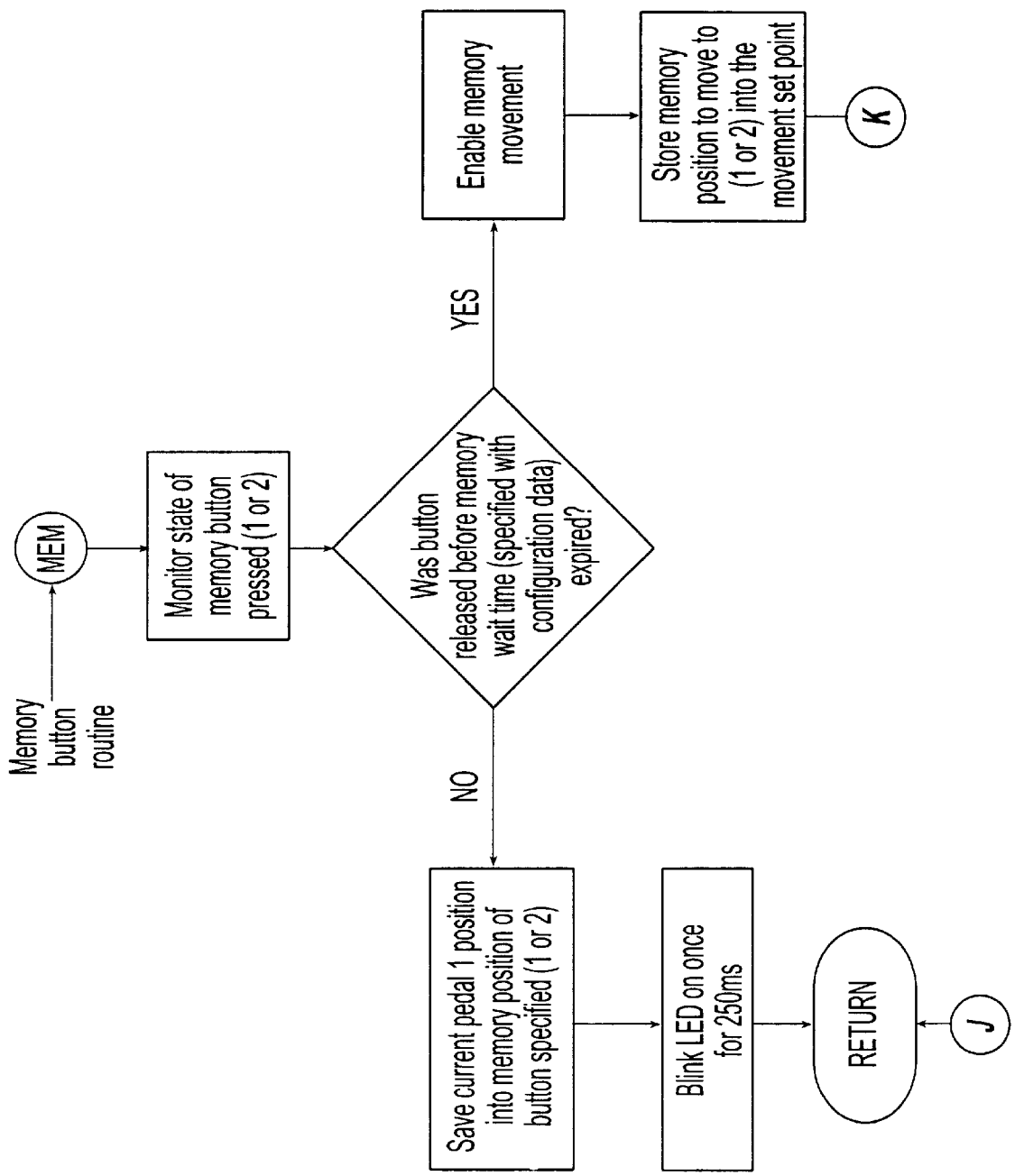
FIGS. 9A–B is a flowchart of a preferred memory button routine utilized by the controller of the adjustable pedal assembly of FIG. 1.
Figure 9B:
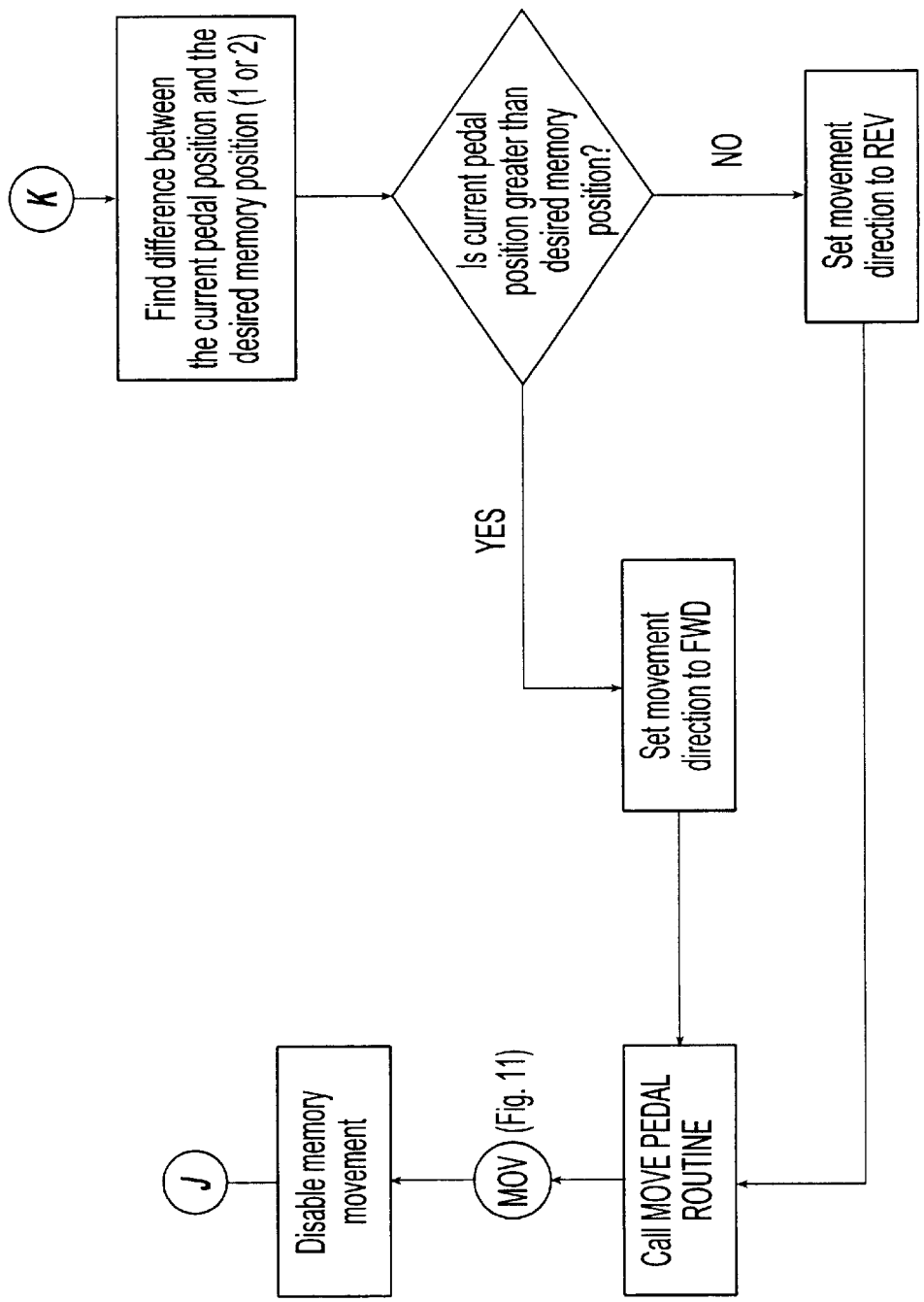

The memory button program loop or routine is best shown in FIGS. 9A–B. If the memory switch 86, 88 is released prior to a predetermined period of time, such as two seconds, memory movement is enabled. The controller 70 determines the difference between the current pedal position and the desired memory position (number of pulses). If the current pedal position is greater than the memory position, the movement direction is set to forward and the move pedal routine is initiated. If the current pedal position is less than the memory position, the movement direction is set to rearward and the move pedal routine is initiated. If the memory switch 86, 88 is not released prior to the predetermined period of time, such as two seconds, the current pedal position (number of pulses from the home position) is saved into the memory position of the memory switch 86, 88 that was pressed by the operator and the LED 84 is blinked for a predetermined period of time such as 250 milliseconds.

Figure 10A:
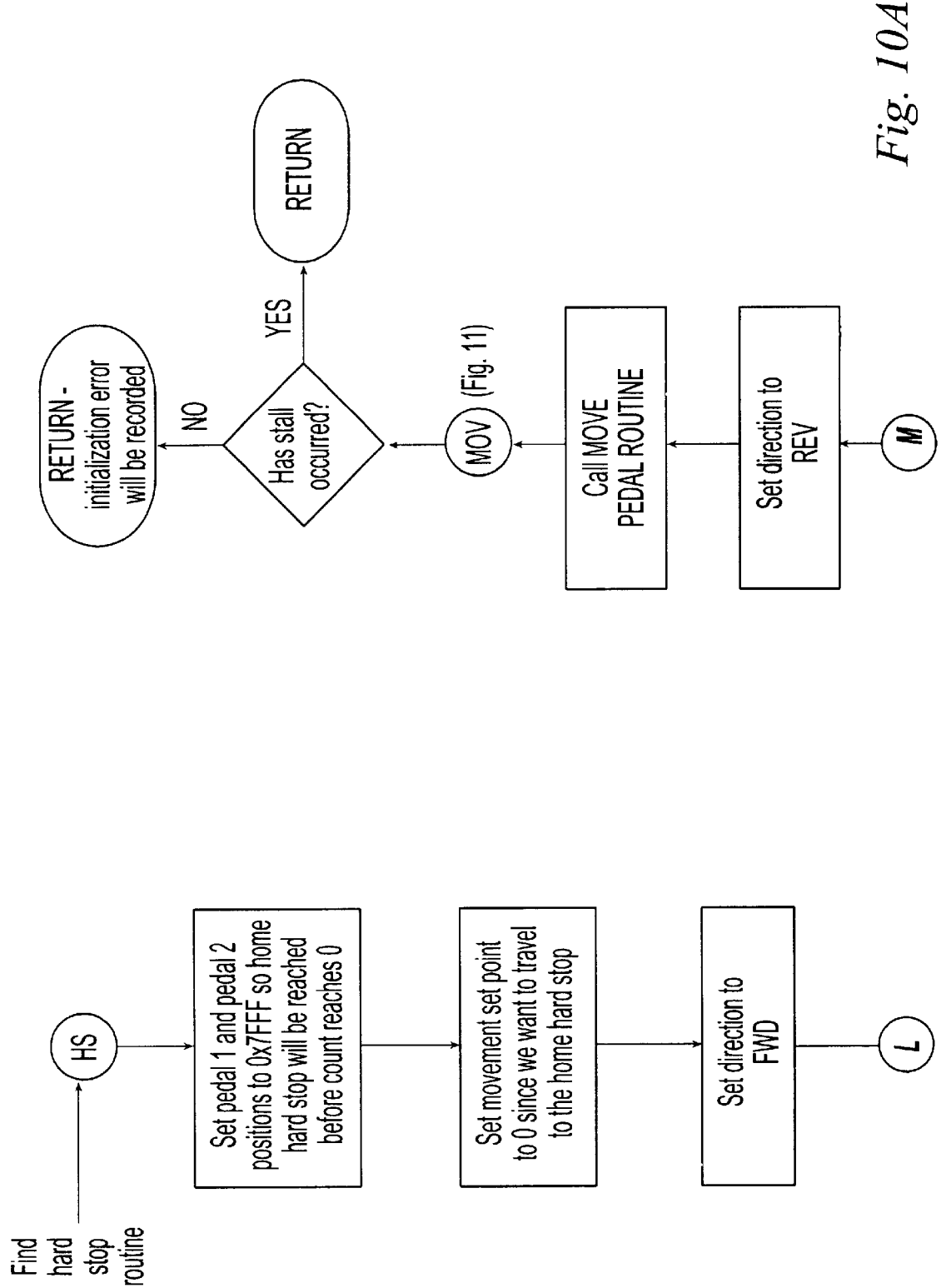
FIGS. 10A–B is a flowchart of a preferred find pedal hard stop routine utilized by the controller of the adjustable pedal assembly of FIG. 1.
Figure 10B:
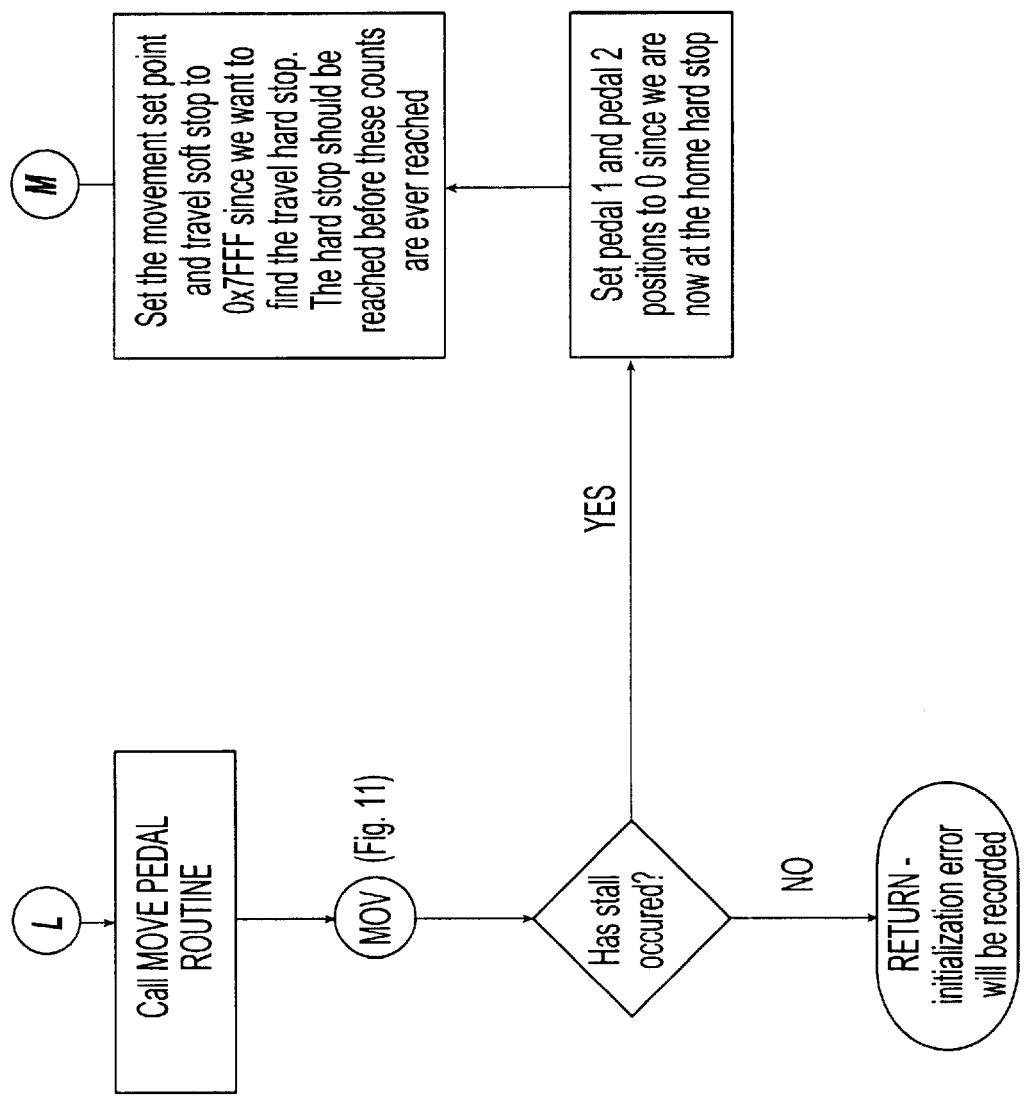
Figure 11A:
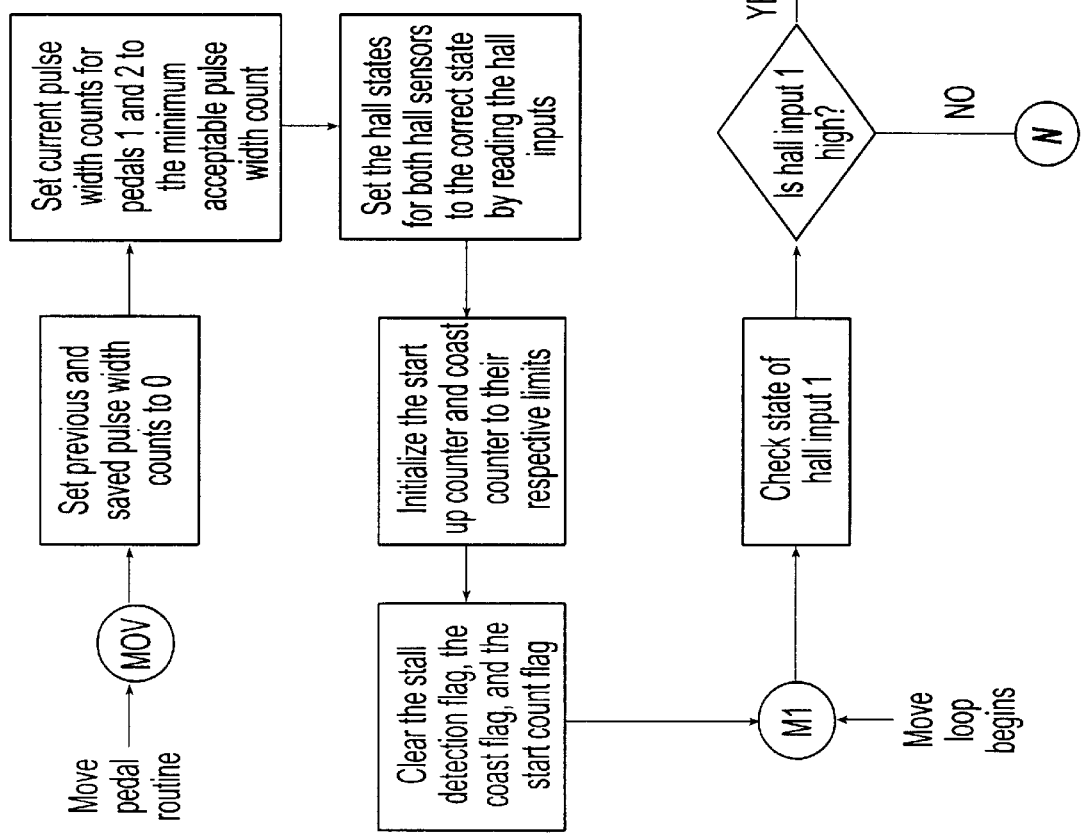
FIGS. 11A–C is a flowchart of a preferred move pedal routine utilized by the controller of the adjustable pedal assembly of FIG. 1.
Figure 11B:
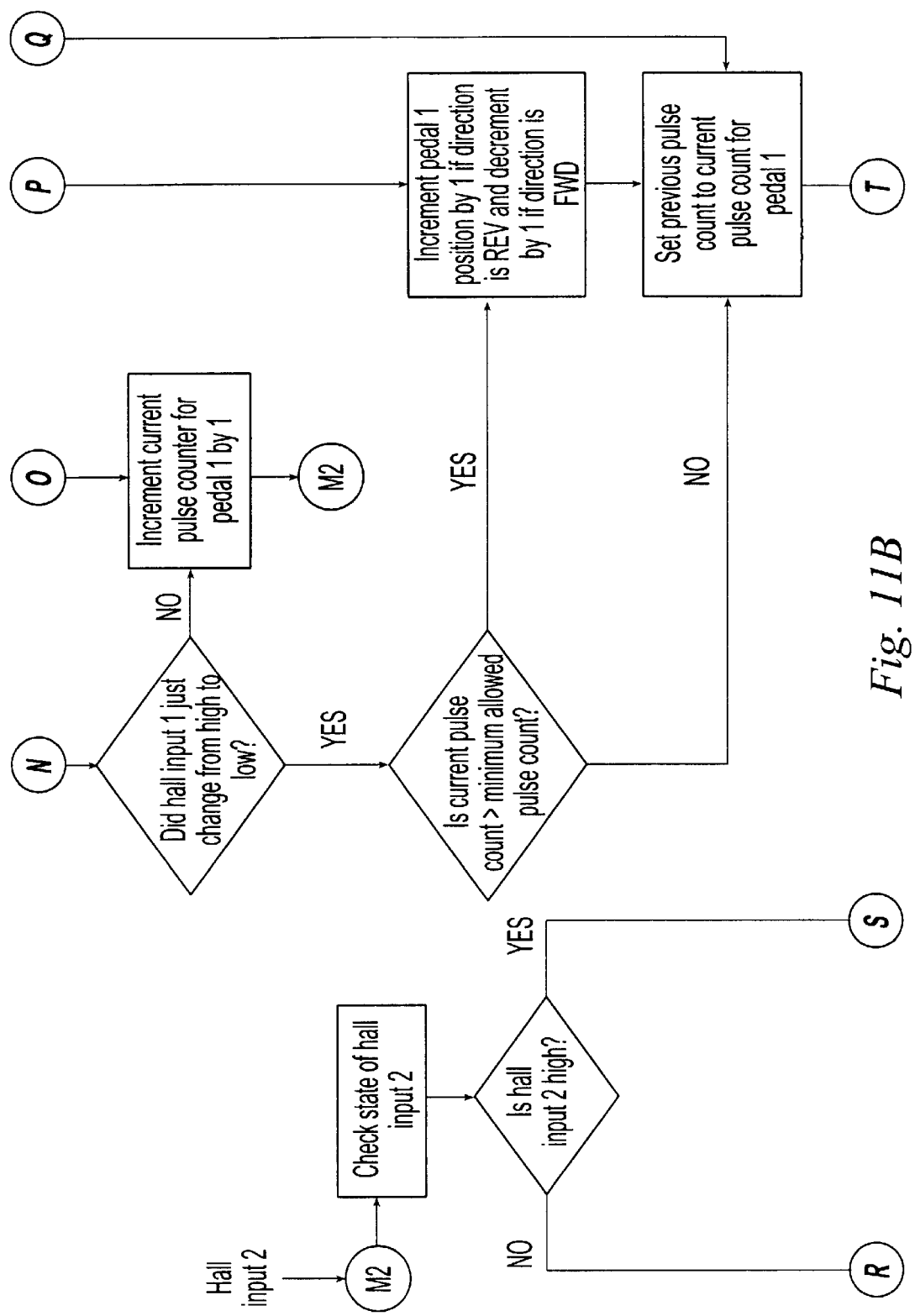
Figure 11C:
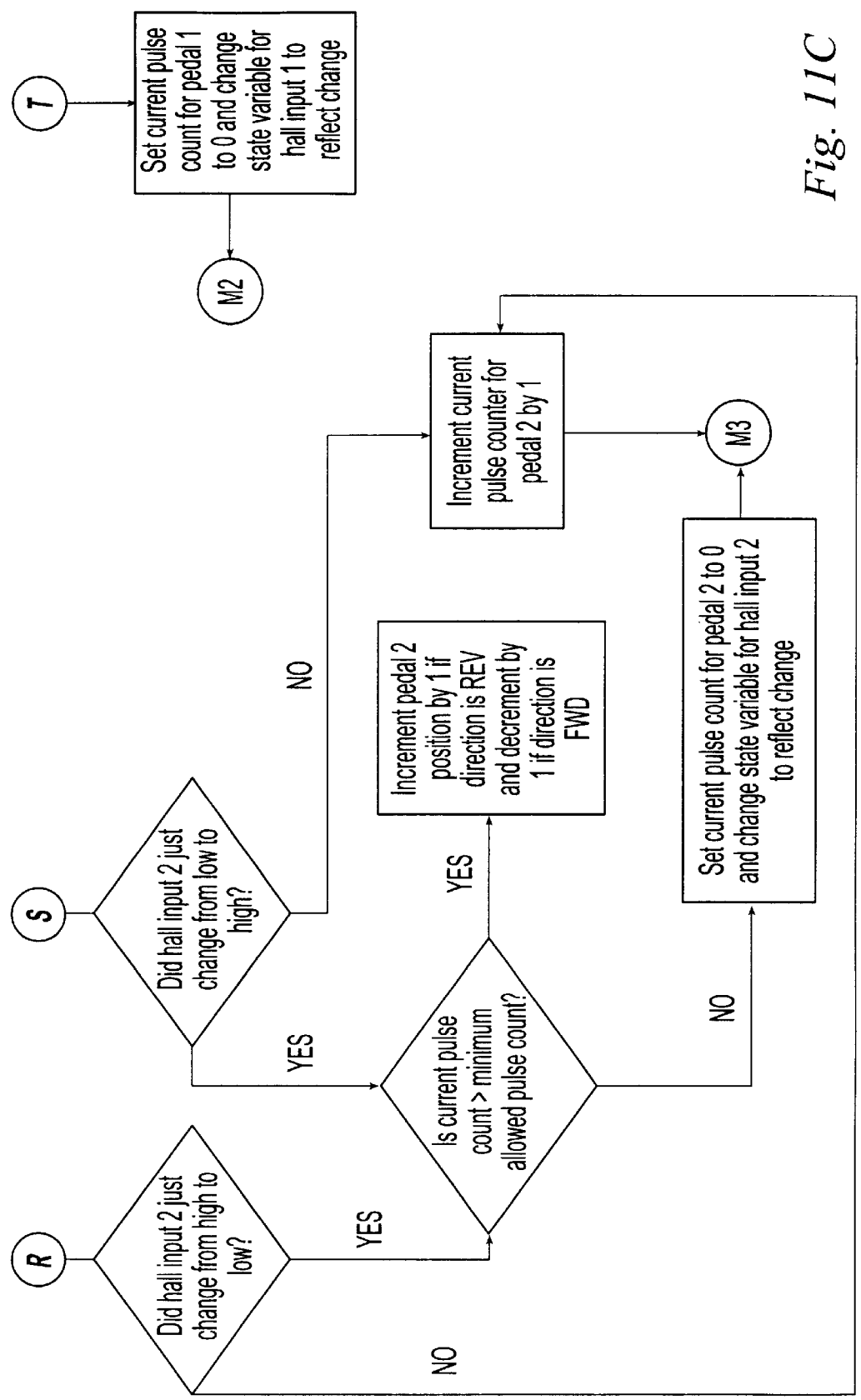
Figure 12A:
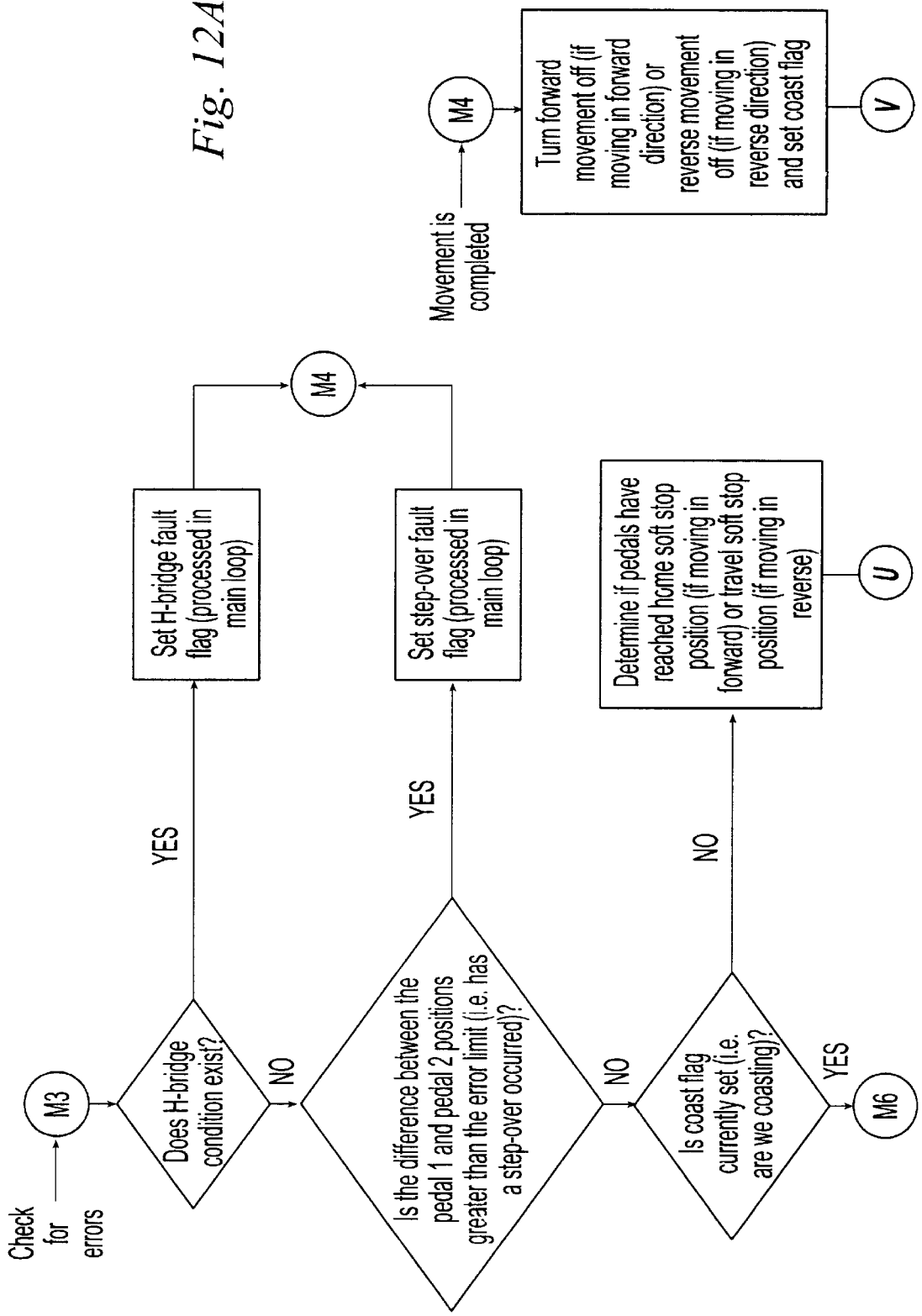
FIGS. 12A–B is a flowchart which is a continuation of the preferred move pedal routine of FIGS. 11A–C.
Figure 12B:
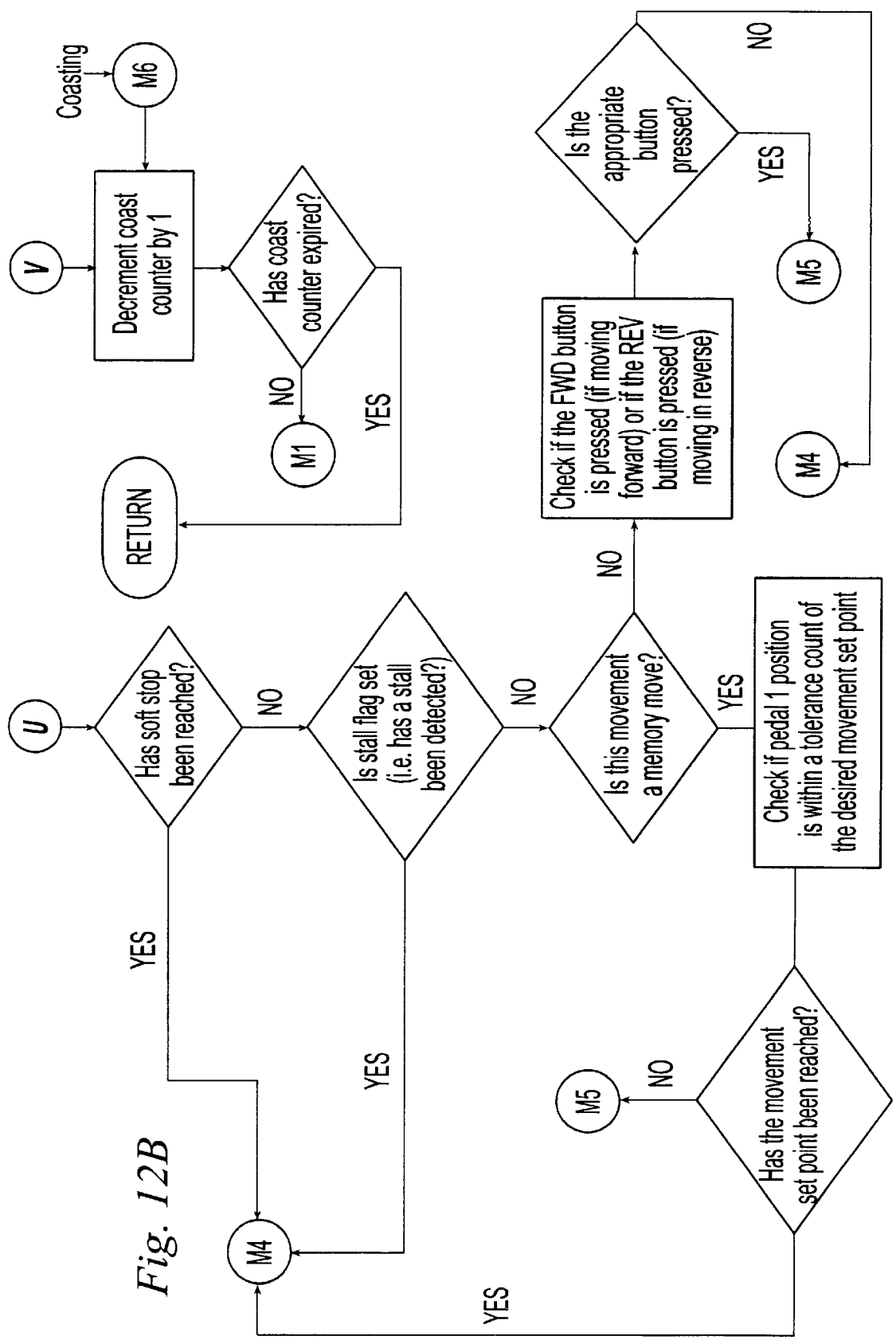
Figure 13A:
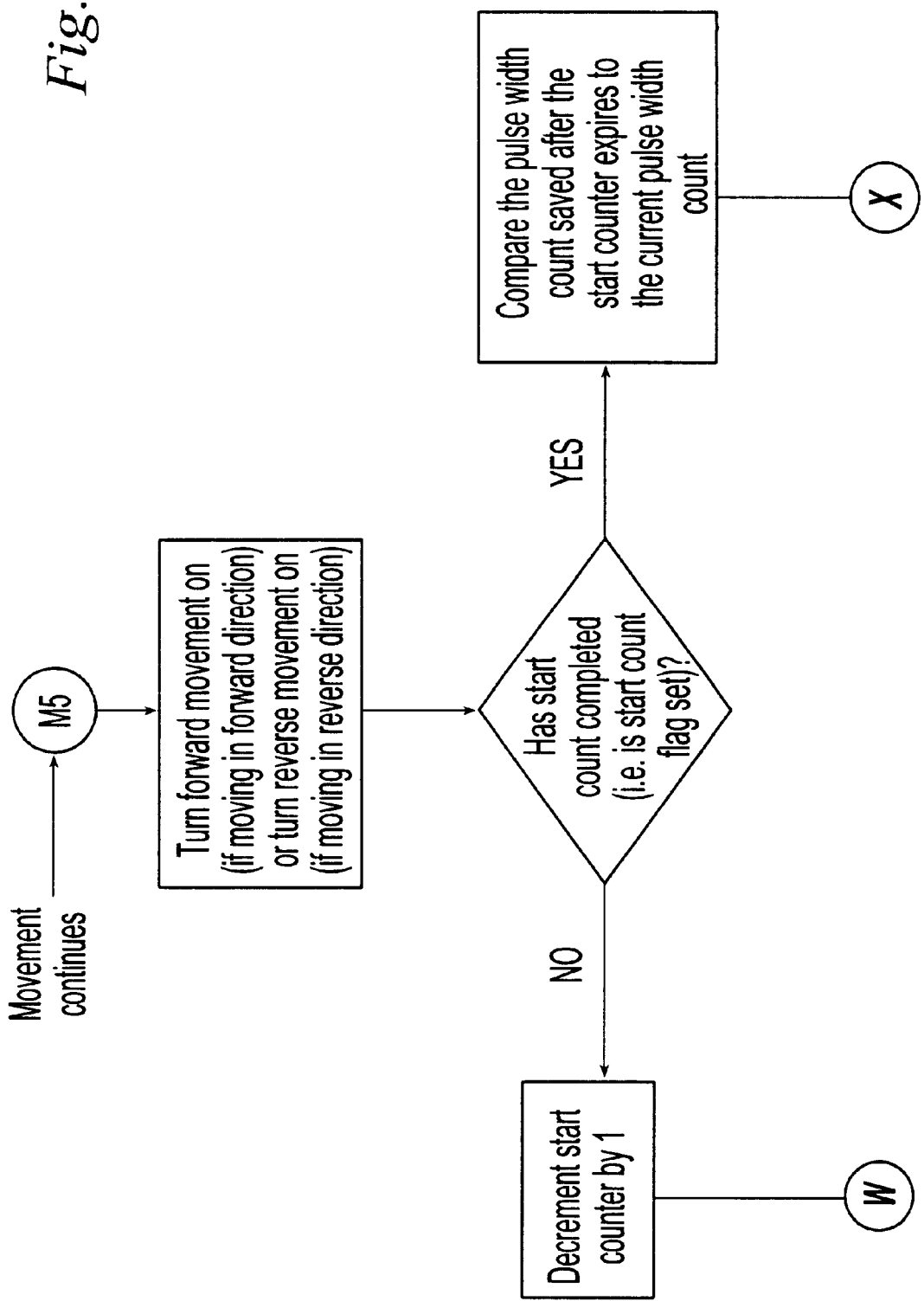
FIGS. 13A–B is a flowchart which is a continuation of the preferred move pedal routine of FIGS. 11A–C and 12A–B.
Figure 13B:
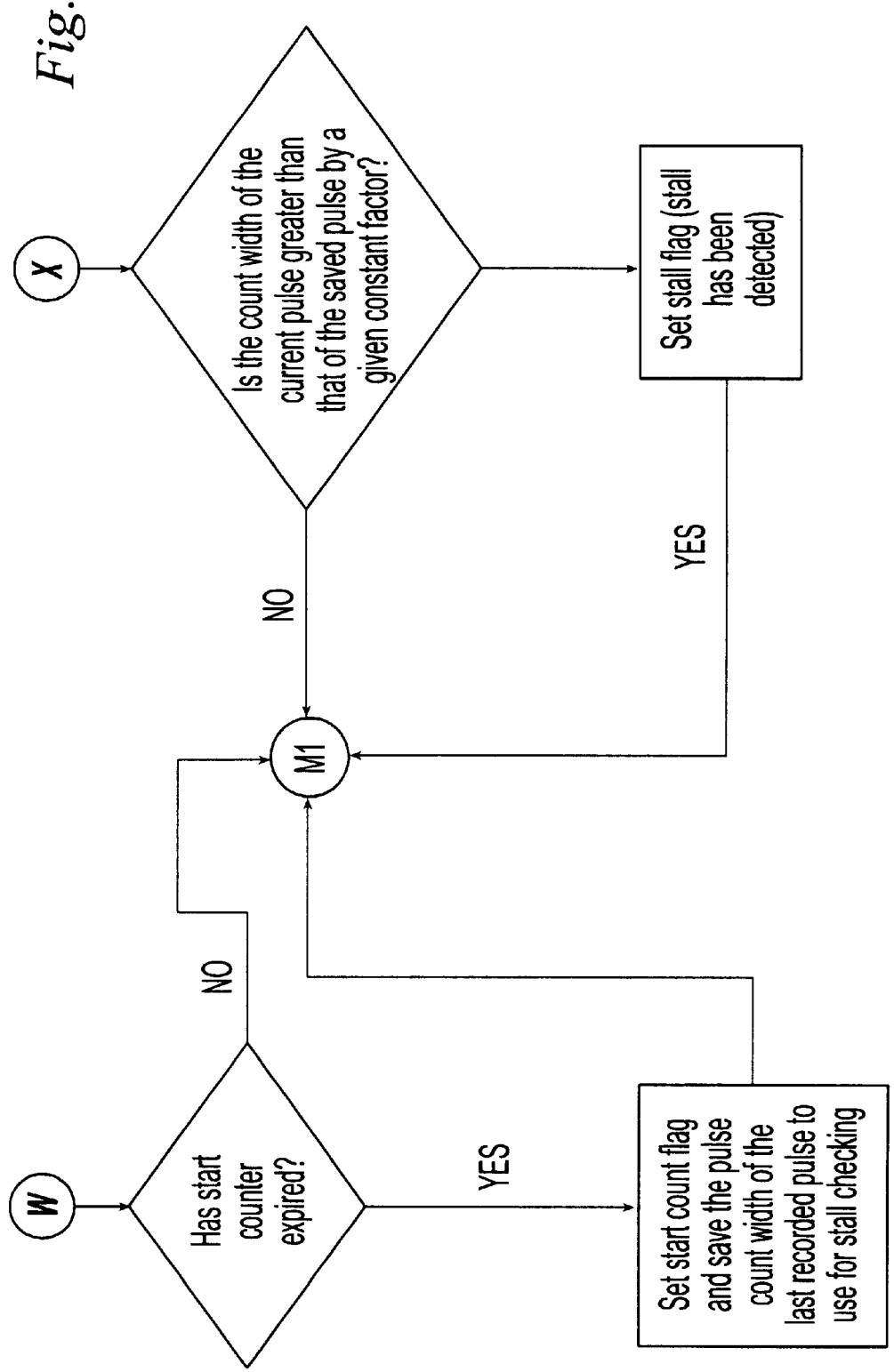

The find pedal hard stop program loop or routine is best shown in FIGS. 10A–B. Initially, the movement set point, that is the current position, is set to zero and the movement direction is set to forward. The move pedal routine is initiated to move the control pedals 12a, 12b in the forward direction for a number of pulses which ensures that the forward hard stop will be engaged. When a stall is detected, the two pedal positions are set to zero because they are at the home hard stop. The movement direction is set to rearward and the move pedal routine is initiated to move the control pedals 12a, 12b in the rearward direction for a number of pulses which ensures that the rearward hard stop will be engaged. When a stall is detected, the travel hard stop is set and the controller 70 returns to the initialization routine.

The move pedal program loop or routine is best shown in FIGS. 11A–13B. Initially, previous and saved pulse width counts are set to zero. The hall-effect sensor 74 of the first control pedal 12a is monitored to determine the state of the sensor pulses (high or low). Each time there is a transition in output from the sensor 74, from either low to high or high to low, the pulse count indicating the current position of the first pedal 12a is incremented or decremented depending on the direction of travel. The hall-effect sensor 74 of the second control pedal 12b is monitored in the same manner. With the pulse counts indicating the current position of each of the control pedals 12a, 12b being continuously updated, the controller 70 can determine whether the pulse count indicating the current position is equal to the set point indicating a desired position. When a set point is reached, the movement is complete.

During the move pedal routine, the controller 70 continuously checks for various conditions which indicate movement should be stopped. For example, the controller 70 determines if the home soft stop has been reached if travelling in the forward direction and if the travel soft stop has been reached in travelling in the rearward direction. If a soft stop is reached, movement is complete. The controller 70 also determines if a stall condition is present. If a stall condition is detected, movement is stopped and/or reversed. The controller 70 further determines if there is a step over error, that is the first and second control pedals 12a, 12b are not in the same current position. If there is a step-over error, movement is complete. The move routine continues to loop until the movement is complete or the direction switch 80, 82 is released by the operator and the controller stops the motor 60.

During movement of the control pedals 12a, 12b, rotation of the motor 60 rotates the drive screw 54 through the drive cable 62 and causes the drive nut 58 to axially move along the drive screw 54 in the desired direction. The drive nut 58 moves along the drive screw 54 because the drive nut 58 is held against rotation with the drive screw 54 by the lower guide pin 50. As the drive nut 58 axially moves along the drive screw 54, the lower guide pin 50 moves along the lower slots 40 because the lower guide pin 50 is secured to the drive nut 58. It is noted that binding of the drive nut 58 along the drive screw 54 is minimized if a self-aligning joint is provided, between the drive screw 54 and the drive screw housing 56 and/or the drive nut 58 and the lower guide pin 50, to automatically align the components so that the drive nut 58 can smoothly travel along the drive screw 54. As the lower guide pin 50 slidingly moves along the lower slots 40, the lower pedal arm 22 is moved therewith to adjust the forward/rearward position of the pedal 24. As the lower pedal arm 22 moves, the upper guide pin 48 slides along the upper slots 38. With such movement, the pedal 24 travels in a substantially linear and horizontal path, that is, the pedal 24 moves in a forward/rearward direction and generally remains at the same height relative to the fixed mounting bracket 28 and the upper pedal arm 16 which does not move relative the mounting bracket 28 during adjustment of the pedal 24. The lower pedal arm 22 pivots as it moves so that the orientation of the pedal 24 slightly changes. This change in orientation of the pedal 24 is typically too small to be detected by the motor vehicle operator. As the position of the pedal 24 is adjusted by rotating the drive screw 54, the upper pedal arm 16 remains in fixed position relative to the mounting bracket 28. It can be seen from the above description that activation of the motor 60 changes the position of the lower pedal arm 22 relative to the upper pedal arm 16 and the position of the pedal 24 relative to the motor vehicle operator but not the position of the upper pedal arm 16 relative to the mounting bracket 28 and therefore does not affect the connection of the upper pedal arm 16 to the control device of the motor vehicle through the booster pin 42.

From the foregoing disclosure and detailed description of certain preferred embodiments, it is also apparent that various modifications, additions and other alternative embodiments are possible without departing from the true scope and spirit of the present invention. For example, it is apparent to those skilled in the art, given the benefit of the present disclosure, that the sensors 74 can have many different forms, quantities, and locations. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An adjustable pedal assembly comprising, in combination:
   a carrier;
   a lower arm supported by the carrier and operatively connected to the carrier for selected movement relative to the carrier;
   a drive assembly operatively connected to the lower arm to selectively move the lower arm relative to the carrier, the drive assembly comprising a drive screw connected to one of the lower arm and the carrier, a drive nut connected to the other of the lower arm and the carrier and cooperating with the drive screw such that the drive nut travels along the drive screw upon rotation of the drive screw to move the lower arm, and an electric motor operatively connected to the drive screw to selectively rotate the drive screw;
   a sensor positioned to detect motion information indicating movement of the lower arm upon rotation of the drive screw; and
   a controller connected to the motor to selectively activate and deactivate the motor and connected to the sensor to receive the motion information from the sensor, the controller having a processor programmed to activate the electric motor upon initialization of the controller to move the lower arm in a first direction until a first mechanical stop is engaged and establish a home stop position and to reverse direction of the electric motor upon engaging the first mechanical stop to move the lower arm in the other direction opposite the first direction until a second mechanical stop is engaged and establish a travel stop position, wherein the home stop position and the travel stop position represent the mechanical limits of travel for the lower arm.

2. The adjustable pedal assembly according to claim 1, wherein the processor is programmed to determine electronic limits of travel for the lower arm based on the mechanical limits of travel to reduce engagement with the first and second mechanical stops during movement of the lower arm.

3. The adjustable pedal assembly according to claim 2, wherein the controller compares a distance between the electronic limits of travel with a predetermined distance to determine if an undesired obstacle was engaged when determining the home stop position and the travel stop position.

4. The adjustable pedal assembly according to claim 1, wherein the motion information includes distance information.

5. The adjustable pedal assembly according to claim 4, wherein the motion information includes velocity information and the processor is programmed to determine a stall condition based on the velocity information during movement of the lower arm.

6. The adjustable pedal assembly according to claim 1, wherein the sensor is one of a hall-effect switch, a potentiometer, a linear hall-effect device, a linear potentiometer, and a current shunt.

7. The adjustable pedal assembly according to claim 1, wherein the sensor is located adjacent the drive screw.

8. The adjustable pedal assembly according to claim 7, wherein the sensor is a hall-effect switch cooperating with a ring magnet rotatable with the drive screw.

9. The adjustable pedal assembly according to claim 1, further comprising:
   a second carrier;
   a second lower arm supported by the second carrier and operatively connected to the second carrier for selected movement relative to the second carrier;
   wherein the drive assembly is operatively connected to the second lower arm to selectively move the second lower arm relative to the second carrier, the drive assembly comprises a second drive screw connected to one of the second lower arm and the second carrier, a second drive nut connected to the other of the second lower arm and the second carrier and cooperating with the second drive screw such that the second drive nut travels along the second drive screw upon rotation of the second drive screw to move the second lower arm, and the electric motor is operatively connected to the second drive screw to selectively rotate the second drive screw;
   a second sensor positioned to detect motion information indicating movement of the second arm upon rotation of the second drive screw; and
   wherein the controller is connected to the second sensor to receive the motion information from the second sensor and the processor is programmed to activate the electric motor upon initialization of the controller to move both the first and second lower arms.

10. The adjustable pedal assembly according to claim 1, wherein the controller determines a total travel length after determining the home stop position and the travel stop position.

11. An adjustable pedal assembly comprising, in combination:
    an upper arm;
    a lower arm supported by the upper arm and operatively connected to the upper arm for selected movement relative to the upper arm;
    a drive assembly operatively connected to the lower arm to selectively move the lower arm relative to the upper arm, the drive assembly comprising a drive screw connected to one of the upper and lower arms, a drive nut connected to the other of the upper and lower arms and cooperating with the drive screw such that the drive nut travels along the drive screw upon rotation of the drive screw to move the lower arm, and an electric motor operatively connected to the drive screw to selectively rotate the drive screw;
    a sensor positioned to detect motion information indicating movement of the lower arm upon rotation of the drive screw, the motion information including distance information and velocity information; and
    a controller connected to the motor to selectively activate and deactivate the motor and to the sensor to receive the motion information from the sensor, the controller having a processor programmed to activate the electric motor upon initialization of the controller to move the lower arm in a first direction until a first mechanical stop is engaged and establish a home stop position and to reverse direction of the electric motor upon engaging the first mechanical stop to move the lower arm in the other direction opposite the first direction until a second mechanical stop is engaged and establish a travel stop position, wherein the home stop position and the travel stop position represent the mechanical limits of travel for the lower arm, and to determine electronic limits of travel for the lower arm based on the mechanical limits of travel, and wherein the processor is programmed to selectively activate the electric motor to move the lower arm to a desired position between the electronic limits of travel, to determine stall conditions of the lower arm based on the velocity information during movement of the lower arm between the electronic limits of travel, and to reverse direction of movement of the lower arm when a stall condition is detected between the electronic limits of travel.

12. An adjustable pedal assembly comprising, in combination:

a carrier;

a lower arm supported by the carrier and operatively connected to the carrier for selected movement relative to the carrier;

a drive assembly operatively connected to the lower arm to selectively move the lower arm relative to the carrier, the drive assembly comprising a drive screw connected to one of the lower arm and the carrier, a drive nut connected to the other of the lower arm and the carrier and cooperating with the drive screw such that the drive nut travels along the drive screw upon rotation of the drive screw to move the lower arm, and an electric motor operatively connected to the drive screw to selectively rotate the drive screw;

a sensor positioned to detect motion information indicating movement of the lower arm upon rotation of the drive screw;

a controller connected to the motor to selectively activate and deactivate the motor and to the sensor to receive the motion information, the controller having a processor programmed to selectively activate the electric motor to move the lower arm, to receive the motion information, and to determine stall conditions of the lower arm based on the motion information during movement of the lower arm;

wherein the controller determines stall conditions of the lower arm during movement of the lower arm in both forward and rearward directions;

wherein the processor is programmed to reverse direction of movement of the lower arm when a stall condition is detected between limits of travel of the lower arm: and wherein the controller stops movement of the lower arm when another stall condition is detected after reversing direction of movement of the lower arm upon detecting the stall condition.

* * * * *